United States Patent
King et al.

(10) Patent No.: US 10,210,869 B1
(45) Date of Patent: Feb. 19, 2019

(54) SYSTEM, DEVICE AND METHOD FOR VALIDATING A 911 CALLER

(71) Applicant: MOTOROLA SOLUTIONS, INC., Chicago, IL (US)

(72) Inventors: Melanie A. King, Hollywood, FL (US); Scott M. Alazraki, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/851,257

(22) Filed: Dec. 21, 2017

(51) Int. Cl.
*G10L 17/00* (2013.01)
*H04L 29/06* (2006.01)
*H04W 4/02* (2018.01)
*H04W 4/90* (2018.01)

(52) U.S. Cl.
CPC ........ *G10L 17/005* (2013.01); *H04L 63/0861* (2013.01); *H04W 4/02* (2013.01); *H04W 4/90* (2018.02)

(58) Field of Classification Search
CPC ............. H04M 1/72533; H04M 1/575; H04M 1/0266; H04M 1/6016; H04M 1/6075; H04M 2250/02; H04M 2250/10; H04M 1/72572; H04M 1/72519; H04M 1/72522; H04M 1/6505; H04M 1/72525; H04M 19/04; H04M 1/56; H04M 2250/60; H04M 3/533
USPC .... 379/201.02, 207.02, 257, 373.03, 373.04, 379/87, 88, 88.02
See application file for complete search history.

(56) References Cited

U.S. PATENT DOCUMENTS

| | | | |
|---|---|---|---|
| 6,680,998 B1* | 1/2004 | Bell | H04M 11/045 379/37 |
| 8,848,877 B2* | 9/2014 | Seidberg | G08B 25/08 379/37 |
| 2008/0031426 A1 | 2/2008 | Weeks | |
| 2014/0051381 A1* | 2/2014 | Ginter, Jr. | H04W 4/90 455/404.1 |
| 2014/0111336 A1* | 4/2014 | Lee | G08B 13/1672 340/540 |
| 2015/0269835 A1* | 9/2015 | Benoit | G08B 25/016 340/539.13 |
| 2017/0172424 A1* | 6/2017 | Eggers | A61B 5/0205 |

FOREIGN PATENT DOCUMENTS

WO WO 2007025227 A2 * 3/2007 ............ H04M 15/00

OTHER PUBLICATIONS

Bernard Marr; "The Amazing Potential of Voice Analytics"; https://www.forbes.com/sites/bernardmarr/2016/08/08/the-amazing-potential-of-voice-analytics/#2c8742f24f77; Aug. 8, 2016.

(Continued)

*Primary Examiner* — Akelaw Teshale
(74) *Attorney, Agent, or Firm* — Perry + Currier, Inc.

(57) ABSTRACT

A system, device and method for validating a 911 caller is provided. A recording is received that includes a voice sample of a caller, the recording associated with an incident. A voiceprint for the caller is generated from the voice sample. A communication device of a responder responding to the incident is identified. An indication of the voiceprint for the caller is transmitted to the communication device, to cause: a comparison of the voiceprint with sound received at the communication device; and, in response to the comparison, an initiation of an action.

20 Claims, 13 Drawing Sheets

(56) References Cited

OTHER PUBLICATIONS

Tomi Kinnunen et al.; "Real-Time Speaker Identification and Verification"; http://citeseerx.ist.psu.edu/viewdoc/download?doi=10.1.1.701.9852&rep=rep1&type=pdf; IEEE Transactions on Audio, Speech, and Language Processing, vol. 14, No. 1; Jan. 1, 2006.

\* cited by examiner

SYSTEM, DEVICE AND METHOD FOR VALIDATING A 911 CALLER

BACKGROUND OF THE INVENTION

In a dispatch center, for example a command center and/or an emergency dispatch center, first responders are dispatched to respond to 911 calls. It may be important to verify and/or validate that a caller that originates the 911 call has been contacted and/or spoken to.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
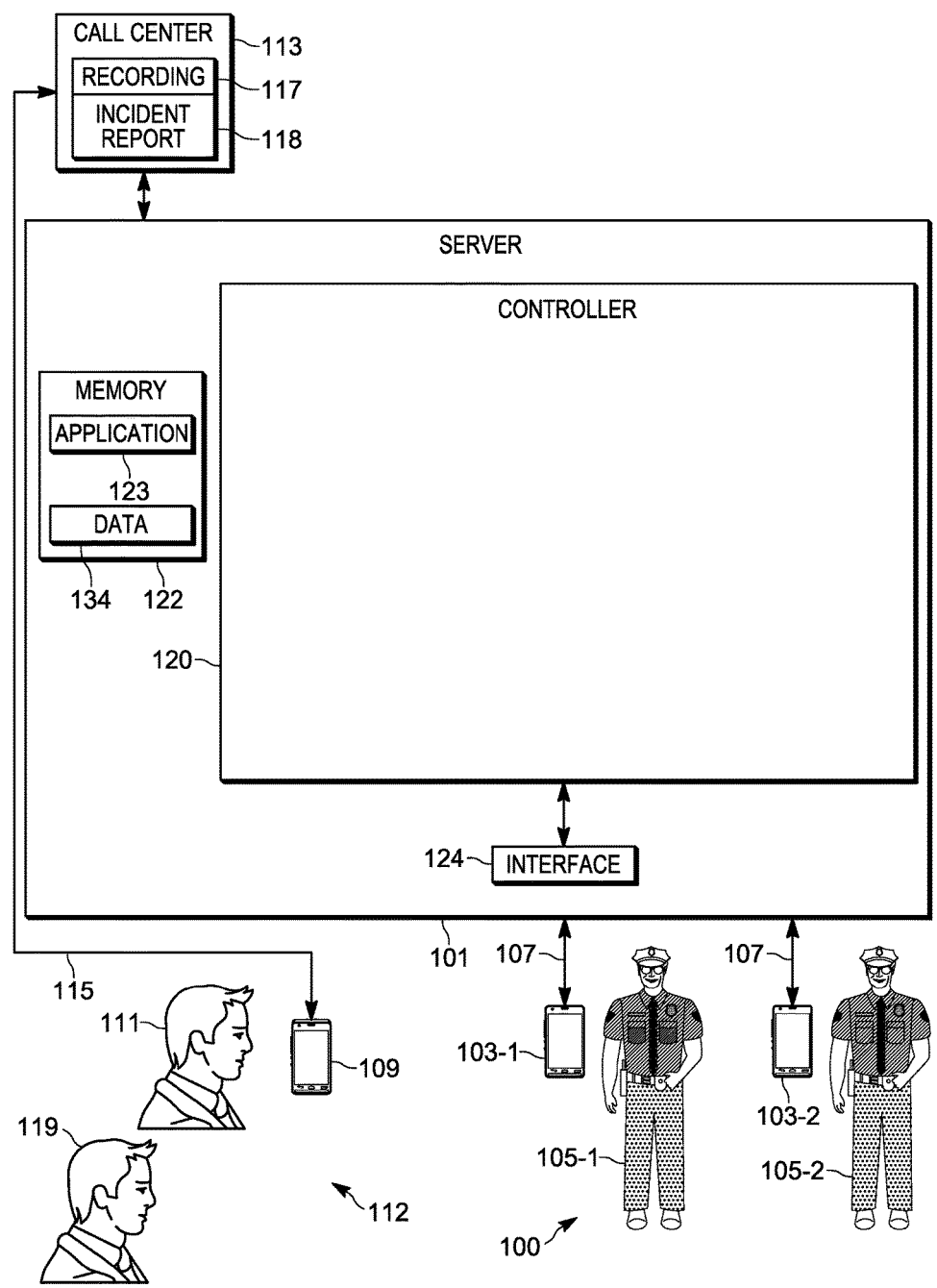
FIG. 1 depicts a system for validating a 911 caller, including a block diagram of a server, such as a dispatch server, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In a dispatch center, for example a command center and/or an emergency dispatch center, first responders are dispatched to respond to 911 calls. It may be important to verify and/or validate that a caller that originates the 911 call has been contacted and/or spoken to. However, when a first responder assigned to the incident arrives at the incident location, such as a house, the person answering the door may pretend to be the caller and tell the first responder that the incident that originated the call has been resolved; the actual caller may be in danger from the person pretending to be the caller.

An aspect of the specification provides a computing device comprising: a controller and a communications interface, the controller configured to: receive a recording including a voice sample of a caller, the recording associated with an incident; generate a voiceprint for the caller; identify a communication device of a responder responding to the incident; and transmit, using the communications interface, an indication of the voiceprint for the caller to the communication device, to cause: a comparison of the voiceprint with sound received at the communication device; and, in response to the comparison, an initiation of an action.

Another aspect of the specification provides a method comprising: receiving, at a controller of a computing device, via a communication interface of the computing device, a recording including a voice sample of a caller, the recording associated with an incident; generating, at the controller, a voiceprint for the caller; identifying, at the controller, a communication device of a responder responding to the incident; and transmitting, using the communications interface, an indication of the voiceprint for the caller to the communication device, to cause: a comparison of the voiceprint with sound received at the communication device; and, in response to the comparison, an initiation of an action.

Another aspect of the specification provides a system comprising: a computing device; and a communication device associated with a responder responding to an incident, the computing device configured to: receive a recording including a voice sample of a caller, the recording associated with the incident; generate a voiceprint for the caller; identify a communication device of a responder responding to the incident; and transmit an indication of the voiceprint for the caller to the communication device, to cause: a comparison of the voiceprint with sound received at the communication device and, in response to the comparison, an initiation of an action, the communication device configured to: receive the indication of the voiceprint; receive the sound using a microphone at the communication device; and cause the voiceprint to be compared to the sound to determine a confidence level of a comparison between the voiceprint and the sound, such that the action is initiated based on the confidence level of the comparison.

FIG. 1 is a block diagram of a system 100 that includes a server 101 in communication with one or more communication devices 103-1, 103-2 of respective responders 105-1, 105-2, via communication links 107. The one or more communication devices 103-1, 103-2 will be interchangeably referred to hereafter, collectively, as the devices 103 and, generically, as a device 103; similarly, the one or more responders 105-1, 105-2 will be interchangeably referred to hereafter, collectively, as the responders 105 and, generically, as a responder 105.

As depicted the system 100 further comprises a communication device 109 (interchangeably referred to hereafter as the device 109) of a caller 111 at a location 112 (e.g. a house of the caller 111), the communication device 109 used by the caller 111 to call a call center 113 (e.g. a 911 call center, and the like) using a communication link 115, for example to report an incident.

As depicted, the call center 113 generates a recording 117 of the call from the caller 111, and an incident report 118 associated with the call. The recording 117 generally includes a voice of the caller 111 (i.e. the person making the call to the call center 113), a voice of a dispatcher (not depicted) at the call center 113 as well as a voice of anyone speaking in the range of a microphone of the communication device 109 when the call is being made, for example a person 119.

The server 101 is further in communication with the call center 113 and/or the call center 113 may be a component of the server 101, or vice versa. Regardless, the server 101 receives incident reports from the call center 113, such as the incident report 118, and dispatches one or more responders to incident location as defined in the incident reports. The server 101 is further generally enabled to generate a voiceprint of the caller 111 from the recording 117 described in more detail below.

A device 103 of an associated dispatched responder 105 is identified and an indication of the voiceprint of the caller 111 is transmitted to the device 103. For example, one or more of the responders 105 may be dispatched to the location 112 to assist with an incident at the location 112 and attempt to speak with the caller 111 to identify the caller 111, and the indication of the voiceprint of the caller 111 is transmitted to their associated devices 103. Furthermore, as depicted, other people may be located at the location 112, such as the person 119. As will be described below, the devices 103 are generally enabled to receive sound at a respective microphone, when they arrive at the location 112, to cause a comparison between a voiceprint of the caller 111 and the sound received at a device such that an action is initiated based on the comparison. Such a comparison may occur at the server 101 and/or at the device 103 receiving the sound.

In specific embodiments, the server 101 comprises a dispatch center and/or a command center and/or a computer aided dispatch device, including, but not limited to, an emergency dispatch center used to communicate with first responders and/or emergency responders, as the responder 105 operating the device 103.

In some embodiments, as depicted, the devices 103 generally each comprise a mobile device which includes, but is not limited to, any suitable combination of electronic devices, communication devices, computing devices, portable electronic devices, mobile computing devices, portable computing devices, tablet computing devices, telephones, PDAs (personal digital assistants), cellphones, smartphones, e-readers, mobile camera devices and the like. However, other suitable devices are within the scope of present embodiments including non-mobile radios and non-mobile communication devices.

Furthermore, one or more of the devices 103 may be incorporated into vehicles, and the like (for example emergency service vehicles), as a radio, an emergency radio, and the like.

Indeed, in some embodiments, one or more of the devices 103 is specifically adapted for emergency service radio functionality, and the like, used by emergency responders and/or emergency responders, including, but not limited to, police service responders, fire service responders, emergency medical service responders, and the like. In some of these embodiments, one or more of the devices 103 further includes other types of hardware for emergency service radio functionality, including, but not limited to, push-to-talk ("PTT") functionality.

Hence, while present embodiments are described with respect to the responders 105 being a police service responder and/or a police officer, the responder 105 may alternatively be a responder and/or a first responder of another type, including, but not limited to, fire service responders, emergency medical service responders, and the like.

Furthermore, while present embodiments are described with respect two devices 103, the server 101 is generally in communication with tens, hundreds, or even thousands of devices, similar to the devices 103, depending on a number of first responders and/or devices being managed by the server 101.

Attention is next directed to the server 101 which comprises: a controller 120, a memory 122, storing an application 123, and a communication interface 124, interchangeably referred to hereafter as the interface 124. The controller 120 is generally configured for communication with at least the devices 103, for example using the interface 124.

As depicted, the memory 122 further alternatively stores data 134 used by the server 101 and/or the controller 120 to determine an identity of the caller 111 and/or any other people at the location 112, such as the person 119, as described in more detail below. The data 134 will be described in more detail below with respect to FIG. 2. However, in some embodiments, the data 134 may be at least partially stored at another memory accessible to the controller 120 (e.g. at another server and/or another device), and the controller 120 is in communication with the other memory, and the data 134 stored at the other memory may be retrieved from the other memory upon request by the controller 120. Furthermore, in some embodiments, the data 134 is stored in a database at the memory 122 and/or another memory.

The controller 120 includes one or more logic circuits, one or more processors, one or more microprocessors, one or more ASIC (application-specific integrated circuits) and one or more FPGA (field-programmable gate arrays). In some embodiments, the controller 120 and/or the server 101 is not a generic controller and/or a generic device and/or a generic server, but a device specifically configured to implement functionality for validating a 911 caller. For example, in some embodiments, the server 101 and/or the controller 120 specifically comprises a computer executable engine configured to implement specific functionality for validating a 911 caller.

The memory 122 comprises a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 1, programming instructions (e.g., machine readable instructions) that implement the functional teachings of the server 101 as described herein are maintained, persistently, at the memory 122 and used by the controller 120 which makes appropriate utilization of volatile storage during the execution of such programming instructions.

In particular, the memory 122 of FIG. 1 stores instructions corresponding to the application 123 that, when executed by the controller 120, enables the controller 120 to: receive a recording 117 including a voice sample of a caller, the recording associated with an incident; generate, from the voice sample, a voiceprint for the caller; identify the communication device 103 of a responder 105 responding to the incident; and transmit, using the communications interface 124, an indication of the voiceprint for the caller to the communication device 103, to cause: a comparison of the voiceprint with sound received at the communication device 103; and, in response to the comparison, an initiation of an action.

The interface 124 is generally configured to communicate with the devices 103 using wired and/or wireless communication links, as desired, including, but not limited to, cables, WiFi links and the like. Such communication links include the links 107 and hence, the links 107 may include any suitable combination of wired networks and/or wireless networks.

The interface 124 is generally configured to communicate with the devices 103, for example, using one or more communication channels over the links 107. In these embodiments, the interface is implemented by, for example, one or more radios and/or connectors and/or network adaptors, configured to communicate wirelessly, with network architecture that is used to implement one or more communication channels between the server 101 and the devices 103 and/or a wireless network. Indeed, the server 101 and the interface 124 generally facilitate communication with the devices 103 using communication channels. In these embodiments, the interface 124 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a Worldwide Interoperability for Microwave Access (WiMAX) transceiver operating in accordance with an IEEE 802.16 standard, and/or other similar type of wireless transceiver configurable to communicate via a wireless network for infrastructure communications.

In yet further embodiments, the interface 124 includes one or more local area network or personal area network transceivers operating in accordance with an IEEE 802.11 standard (e.g., 802.11a, 802.11b, 802.11g), or a Bluetooth™ transceiver which may be used to communicate with the device 103. In some embodiments, the interface 124 is further configured to communicate "radio-to-radio" on some communication channels (e.g. in embodiments where the interface 124 includes a radio), while other communication channels are configured to use wireless network infrastructure.

Example communication channels over which the interface 124 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

However, in other embodiments, the interface 124 communicates with the device 103 using other servers and/or communication devices, for example by communicating with the other servers and/or communication devices using, for example, packet-based and/or internet protocol communications, and the like, and the other servers and/or communication devices use radio communications to wirelessly communicate with the devices 103. Such communication is, in present embodiments, nonetheless channel-based.

Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like. Indeed, groups of channels may be logically organized into talkgroups, though channels in a talkgroup may be dynamic as the traffic (e.g. communications) in a talkgroup may increase or decrease, and channels assigned to the talkgroup may be adjusted accordingly.

In any event, it should be understood that a wide variety of configurations for the server 101 are within the scope of present embodiments.

Figure 2:
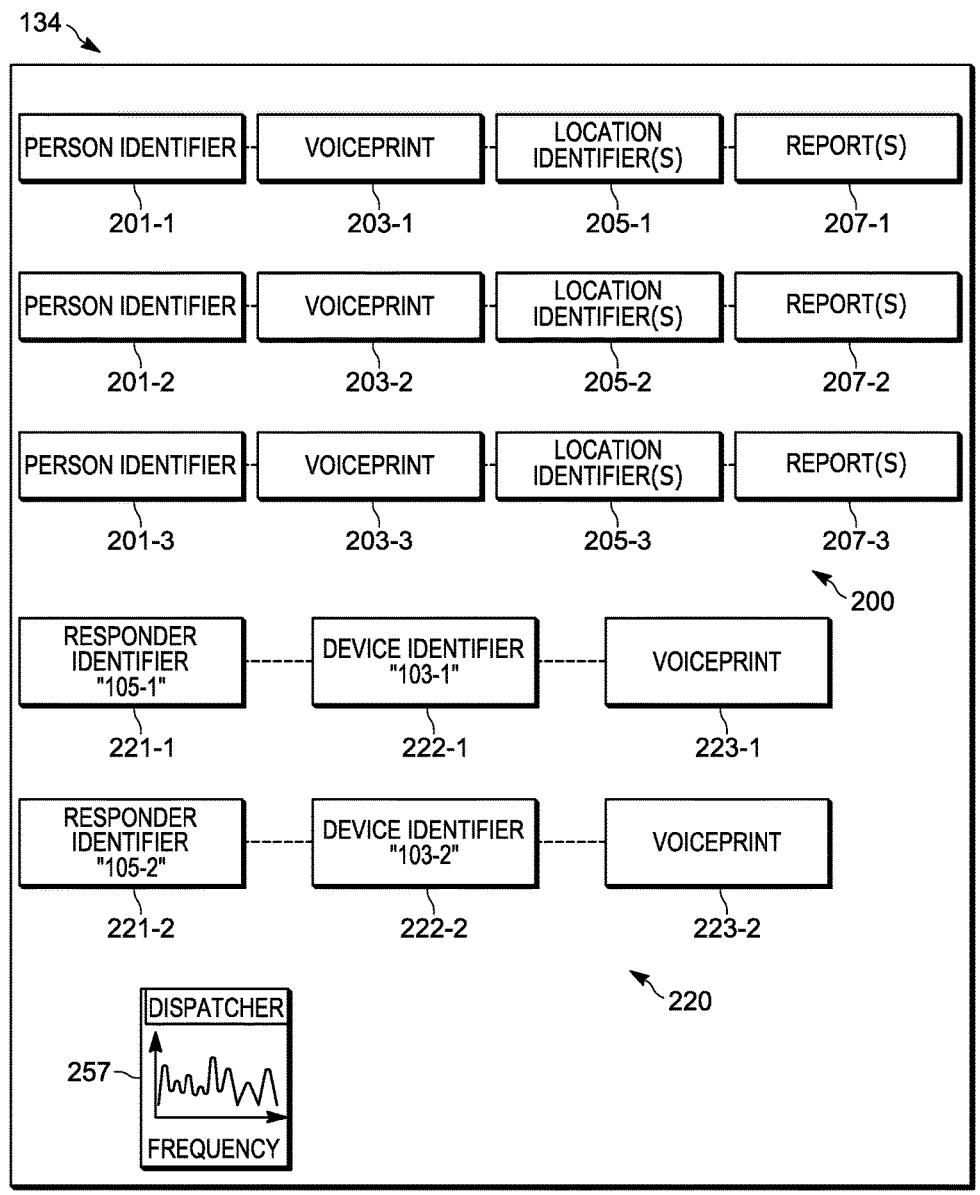
FIG. 2 depicts example data stored at a memory of the server in the system of FIG. 1, the data used in assisting with validating a 911 caller in accordance with some embodiments.

Attention is next directed to FIG. 2 which depicts an example of the data 134 stored at the memory 122. In particular, the data 134 includes records 200, each of which include an identifier of a person (e.g. person identifiers 201-1, 201-2 . . . 201-3, interchangeably referred to hereafter, collectively, as the person identifiers 201 and, generically, as a person identifier 201), an associated voice sample (e.g. voiceprints 203-1, 203-2 . . . 203-3, interchangeably referred to hereafter, collectively, as the voiceprints 203 and, generically, as a voiceprint 203), one or more associated location identifiers (e.g. location identifiers 205-1, 205-2 . . . 205-3, interchangeably referred to hereafter, collectively, as the location identifiers 205 and, generically, as a location identifiers 205), and any associated reports (e.g. reports 207-1, 207-2 . . . 207-3, interchangeably referred to hereafter, collectively, as the reports 207 and, generically, as a report 207).

In FIG. 2, associations between a respective person identifier 201, a respective person identifier 201, a respective voiceprint 203, respective one or more location identifiers 205, and respective one or more reports 207 are depicted via dashed lines therebetween.

Each record 200 may correspond to a previous call to the call center 113, assuming that: a voiceprint 203 was generated for a call, and the caller was identified (e.g. via another database, such as a criminal database, a driver's license database, and the like) using, for example, a name of the caller received during a call.

Hence, each of the person identifiers 201 may include a name of a caller, but may include other types of identifiers, such as a driver's license number, a social security number, and the like.

The location identifiers 205 may include one or more identifiers of locations (e.g. addresses, and the like) associated with previous calls from the person identified by the associated person identifier 201, and/or associated incidents, and/or identifiers of locations associated with person in general, such as a home address, a work address and/or any other address associated with the person.

The reports 207 may include one or more of: an incident report associated with a previous call by the person identified by the associated person identifier 201; a criminal record of the person identified by the associated person identifier 201; a police record of the person identified by the associated person identifier 201; and the like.

While the records 200 are depicted in a specific format, the records 200 may be in any suitable format, including a database format.

Furthermore, while only three records 200 are depicted, a number of the records 200 may be any number, depending on the number of calls to the call center 113 for which voiceprints 203 were generated and/or a number of callers that were identified on those calls. However, in some embodiments, the voiceprints 203, the location identifiers 205 and the reports 207 may be stored without an associated person identifier 201 (e.g. when a caller cannot be identified); in these embodiments, an associated location identifier 205 and an associated report 207 may comprise a location of an incident and a report associated with a previous call, even though the caller could not be identified.

Furthermore, the records 200 may further indicate associations between persons identified by the person identifiers 201. For example, the person identified by the person identifier 201-3 may be a known associate and/or a known criminal associate of the person identified by the person identifier 201-1, and the records 220 may indicate such an association.

As depicted, the data 134 further includes records 220, each of which comprises a respective responder identifier 221-1, 221-2, associated device identifiers 222-1, 222-2, and associated voiceprints 223-1, 223-2. The responder identifiers 221-1, 221-2 are interchangeably referred to hereafter, collectively, as the responder identifiers 221 and, generically, as a responder identifier 221; similarly, the device identifiers 222-1, 222-2 are interchangeably referred to hereafter, collectively, as the device identifiers 222 and, generically, as a device identifier 222; and similarly, the voiceprints 223-1, 223-2 are interchangeably referred to hereafter, collectively, as the voiceprints 223 and, generically, as a voiceprint 223.

Each responder identifier 221 identifies a respective responder 105 (e.g. a badge number, an employee number, and the like, as depicted "105-1", "105-2" corresponding to the responders 105-1, 105-2), and each device identifier 222 identifies a respective device 103-1, 103-2 assigned to a respective responder (e.g. an email address, a phone number, a media access control (MAC) address), and the like, as depicted "103-1", "103-2" corresponding to the devices 103-1, 103-2). Each voiceprint 223 comprises a voiceprint of a respective responder 105 generated, for example, when each responder 105 is initially employed by a public service entity, and/or at a later time While only two records 220 are depicted, a number of records 220 generally corresponds to a number of responders 105 and/or devices 103 being managed by the server 101 and/or a number of responders 105 and/or devices 103 that are presently deployed in a shift, for example.

As depicted, the data 134 further stores a dispatcher voiceprint 257 of a dispatcher, and the like, at the call center 113, who spoke with the caller 111 on the call to the call center 113. The voiceprint 257 may be generated when the dispatcher is initially employed by the call center 113 and/or at a later time. Either way, the dispatcher voiceprint 257 enables the server 101 to filter out a voice of the dispatcher from the recording 117. While as depicted, the data 134 includes only one dispatcher voiceprint 257, the data 134 may include dispatcher voiceprints for all dispatchers working at the call center 113.

As depicted, the dispatcher voiceprint 257 comprises a graph showing a spectrum of frequencies, and their relative intensities, of the voice of the dispatcher. The dispatcher voiceprint 257 may be generated using a spectrum analyzer and/or a spectrum analyzer algorithm, and the like.

Though not graphically depicted, it is further appreciated that each of the voiceprints 203, 223 are represented in a similar manner as the dispatcher voiceprint 257 and represent the voices (e.g. a spectrum of frequencies, and their relative intensities and the like) of the speakers from which the voiceprints 203, 223 were generated.

Figure 3:
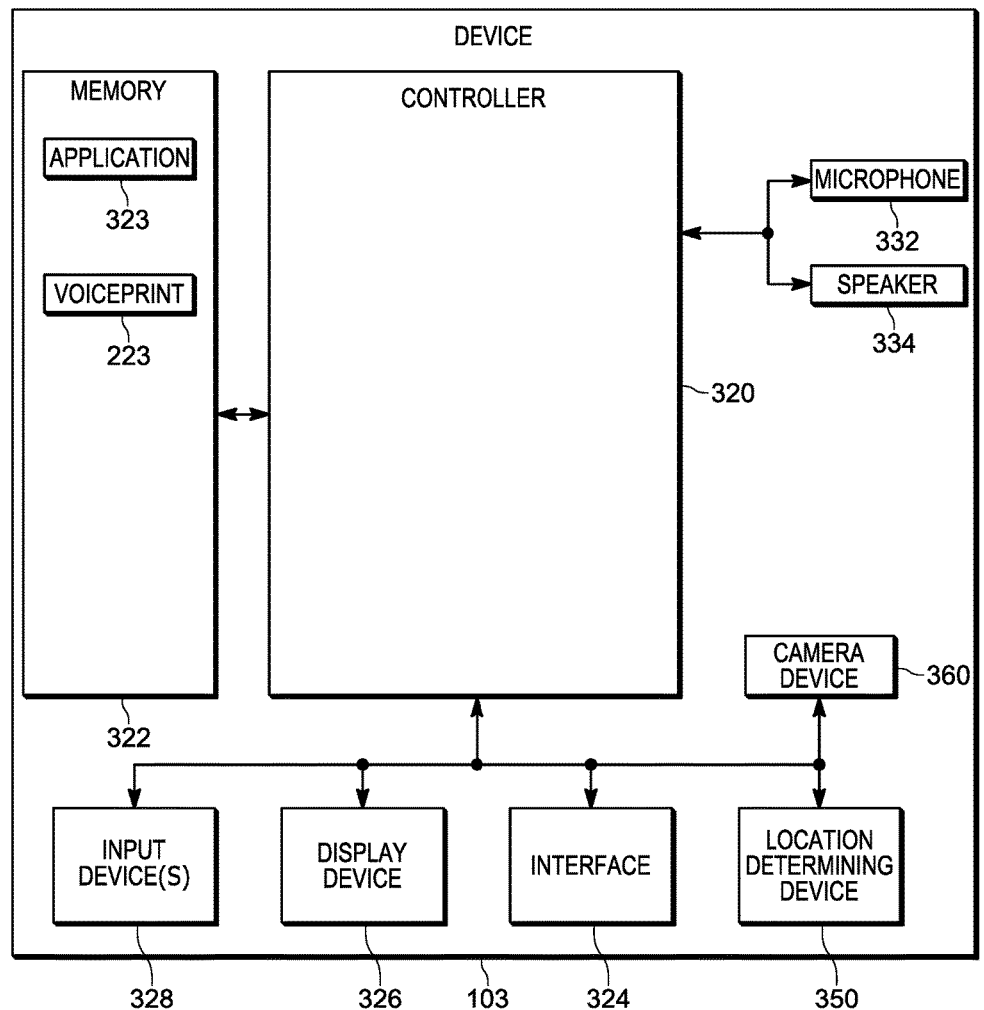
FIG. 3 depicts a block diagram of a communication device of a responder in the system of FIG. 1 in accordance with some embodiments.

Attention is now directed to FIG. 3, which depicts a block diagram of an example device 103. Each device 103 comprises a respective controller 320, a memory 322 storing an application 323 and a communication interface 324, interchangeably referred to hereafter as the interface 324, and a display device 326 (e.g. a flat panel display, and the like) and at least one input device 328 (e.g. a keyboard, a touch screen, a point device, buttons, and the like), at least one microphone 332 and speaker 334. The controller 320, the memory 322, and the interface 324 are each respectively similar to the controller 120, the memory 122 and the interface 124 of the server 101 adapted, however, for use in a mobile device. Furthermore, the microphone 332 and the speaker 334 may be used for telephonic functionality. However, the microphone 332 may also be used to implement functionality for validating a 911 caller, for example by the controller 320 executing the application 323.

Indeed, the application 323, when executed by the controller 320, enables the controller 320 to implement functionality of the device 103 including, but not limited to: receive an indication of a voiceprint; receive sound using the microphone 332; and cause the voiceprint to be compared to the sound to determine a confidence level of a comparison between the voiceprint and the sound, such that an action is initiated based on the confidence level of the comparison. In some embodiments, the comparison occurs at the device 103 receiving the sound while in other embodiments, the sound is transmitted to another device for comparison, for example the server 101 (i.e. the sound is converted to sound data and transmitted).

Hence, in general, the controller 320 includes one or more logic circuits, one or more processors, one or more microprocessors, one or more ASIC (application-specific integrated circuits) and one or more FPGA (field-programmable gate arrays). In some embodiments, the controller 320 and/or a device 103 is not a generic controller and/or a generic device, but a device specifically configured to implement functionality for validating a 911 caller. For example, in some embodiments, a device 103 and/or the controller 320 specifically comprises a computer executable engine configured to implement specific functionality for validating a 911 caller.

Furthermore, as depicted, the memory 322 of the device 103 may be provisioned with a voiceprint 223 of the respective responder 105 associated with the device 103, for example when the device 103 is assigned to the respective responder 105.

As depicted the device 103 further comprises a location determining device 350 which may include, but is not limited to a Global Positioning System (GPS) device, and the like, and which may be used to determine a location of the device 103, a speed of the device 103, and the like.

While not depicted, the device 103 may further comprise any other sensors for determining a speed of the device 103 including, but not limited to, one or more accelerometers, magnetometers, and the like.

As depicted the device 103 further comprises a camera device 360 which may include, but is not limited to a, a video device.

In some embodiments, some of the components of the device 103, for example the camera 360 and/or the microphone 332 and/or the speaker 334, may be deployed as a separate device, for example as a body worn camera and/or as a remote speaker microphone, but may be connected to the device 103 in wired and/or wireless manner (e.g. forming a personal area network (PAN)) to perform the functionality described herein.

In any event, it should be understood that a wide variety of configurations for the devices 103 are within the scope of present embodiments.

Figure 4:
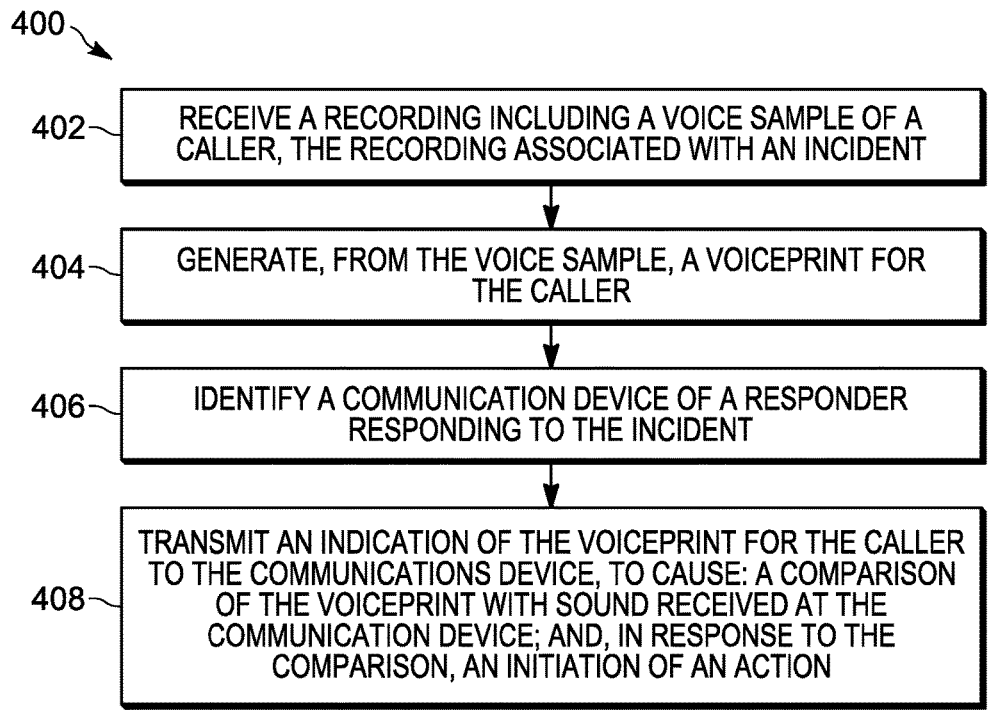
FIG. 4 is a flowchart of a method for validating a 911 caller as implemented in the server in accordance with some embodiments.

Attention is now directed to FIG. 4 which depicts a flowchart representative of a method 400 for validating a 911 caller. In some embodiments, the operations of the method 400 of FIG. 4 correspond to machine readable instructions that are executed by, for example, the server 101 of FIG. 1, and specifically by the controller 120 of the server 101. In the illustrated example, the instructions represented by the blocks of FIG. 4 are stored at the memory 122, for example, as the application 123. The method 400 of FIG. 1 is one way in which the system 100 and/or the server 101 and/or the controller 120 is configured. Furthermore, the following discussion of the method 400 of FIG. 4 will lead to a further understanding of the server 101, and its various components.

However, it is to be understood that the system 100 and/or the server 101 and/or the controller 120 and/or the method 400 may be varied, and need not work exactly as discussed herein in conjunction with each other, and that such variations are within the scope of present embodiments.

Furthermore, the method 400 of FIG. 4 need not be performed in the exact sequence as shown and likewise various blocks may be performed in parallel rather than in sequence. Accordingly, the elements of method 400 are referred to herein as "blocks" rather than "steps".

At a block 402, the controller 120 receives the recording 117 including a voice sample of the caller 111, the recording associated with an incident.

At a block 404, the controller 120 generates, from the voice sample, a voiceprint for the caller 111.

At a block 406, the controller 120 identifies a communication device 103 of a responder 105 responding to the incident.

At a block 408, the controller 120 transmits, using the communications interface 124, an indication of the voiceprint for the caller 111 to the communication device 103, to cause: a comparison of the voiceprint with sound received at the communication device 103; and, in response to the comparison, an initiation of an action. For example, the sound received at a communication device 103 of a responder 105 dispatched to the location 112 may include a voice of the person 111 that originated the 911 call; hence, the comparison of the voiceprint with sound received at the communication device 103 may be used to determine whether the responder 105 dispatched to the location 112 has spoken with the person 111 who made the 911 call. For example, when a match occurs between the sound received at a communication device 103 and the voiceprint for the caller 111, it may be determined that the responder 105 has spoken with the caller 111; however, when no match occurs between the sound received at a communication device 103 and the voiceprint for the caller 111, it may be determined that the responder 105 has not spoken with the caller 111. Furthermore, a determination of a match may be executed by determining a confidence level of the comparison between the sound received at a communication device 103 and the voiceprint for the caller 111; the action initiated may hence depend on whether or not a match occurs, and/or on the confidence level.

Figure 5:
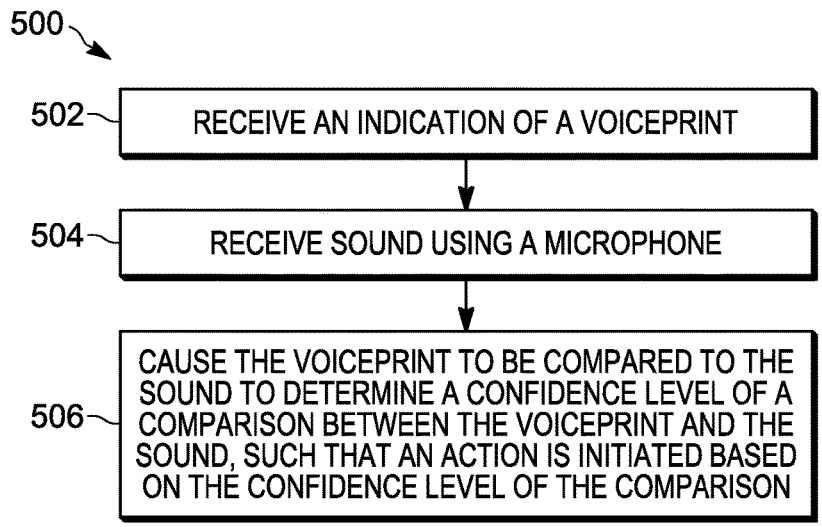
FIG. 5 is a flowchart of a method for validating a 911 caller as implemented in the communication device of the responder in accordance with some embodiments.

Attention is now directed to FIG. 5 which depicts a flowchart representative of a method 500 for validating a 911 caller. In some embodiments, the operations of the method 500 of FIG. 5 correspond to machine readable instructions that are executed by, for example, a device 103 of FIG. 1, and specifically by the controller 320 of the device 103. In the illustrated example, the instructions represented by the blocks of FIG. 5 are stored at the memory 322, for example, as the application 323. The method 500 of FIG. 1 is one way in which the system 100 and/or the device 103 and/or the controller 320 is configured. Furthermore, the following discussion of the method 500 of FIG. 5 will lead to a further understanding of the device 103, and its various components.

However, it is to be understood that the system 100 and/or the device 103 and/or the controller 320 and/or the method 500 may be varied, and need not work exactly as discussed herein in conjunction with each other, and that such variations are within the scope of present embodiments.

Furthermore, the method 500 of FIG. 5 need not be performed in the exact sequence as shown and likewise various blocks may be performed in parallel rather than in sequence. Accordingly, the elements of method 500 are referred to herein as "blocks" rather than "steps".

At a block 502, the controller 320 receives an indication of a voiceprint, for example, from the server 101.

At a block 504, the controller 320 receives sound using the microphone 332, for example when a device 103, and a respective responder 105 is at the location 112; the sound received may include a voice of a person at the location 112, including, but not limited to, one or more of the persons 111, 119.

At a block 504, the controller 320 causes the voiceprint to be compared to the sound to determine a confidence level of a comparison between the voiceprint and the sound, such that an action is initiated based on the confidence level of the comparison. For example, when the confidence level indicates a match between the sound received at a communication device 103 and the voiceprint for the caller 111, it may be determined that the responder 105 has spoken with the caller 111; however, when the confidence level indicates not match between the sound received at a communication device 103 and the voiceprint for the caller 111, it may be determined that the responder 105 has not spoken with the caller 111. The action initiated may hence depend on whether or not a match occurs, and/or on the confidence level.

Example embodiments of the method 400 and the method 500 are now described with reference to FIG. 6 to FIG. 14, with each of FIG. 6, FIG. 7, FIG. 8, FIG. 9, FIG. 12, FIG. 13 and FIG. 14 being substantially similar to FIG. 1, with like elements having like numbers, and each of FIG. 10 and FIG. 11 being substantially similar to FIG. 3, with like elements having like numbers. In each of FIG. 6 to FIG. 14, the controller 120 is assumed to be executing the application 123, and the controller 320 is assumed to be executing the application 323.

Furthermore, while the method 400 and the method 500 are described with respect to the server 101 performing the method 400 and the device 103-1 performing the method 500, aspects of each the methods 400 and the method 500 may be performed on one or both of the server 101 and the device 103-1.

Figure 6:
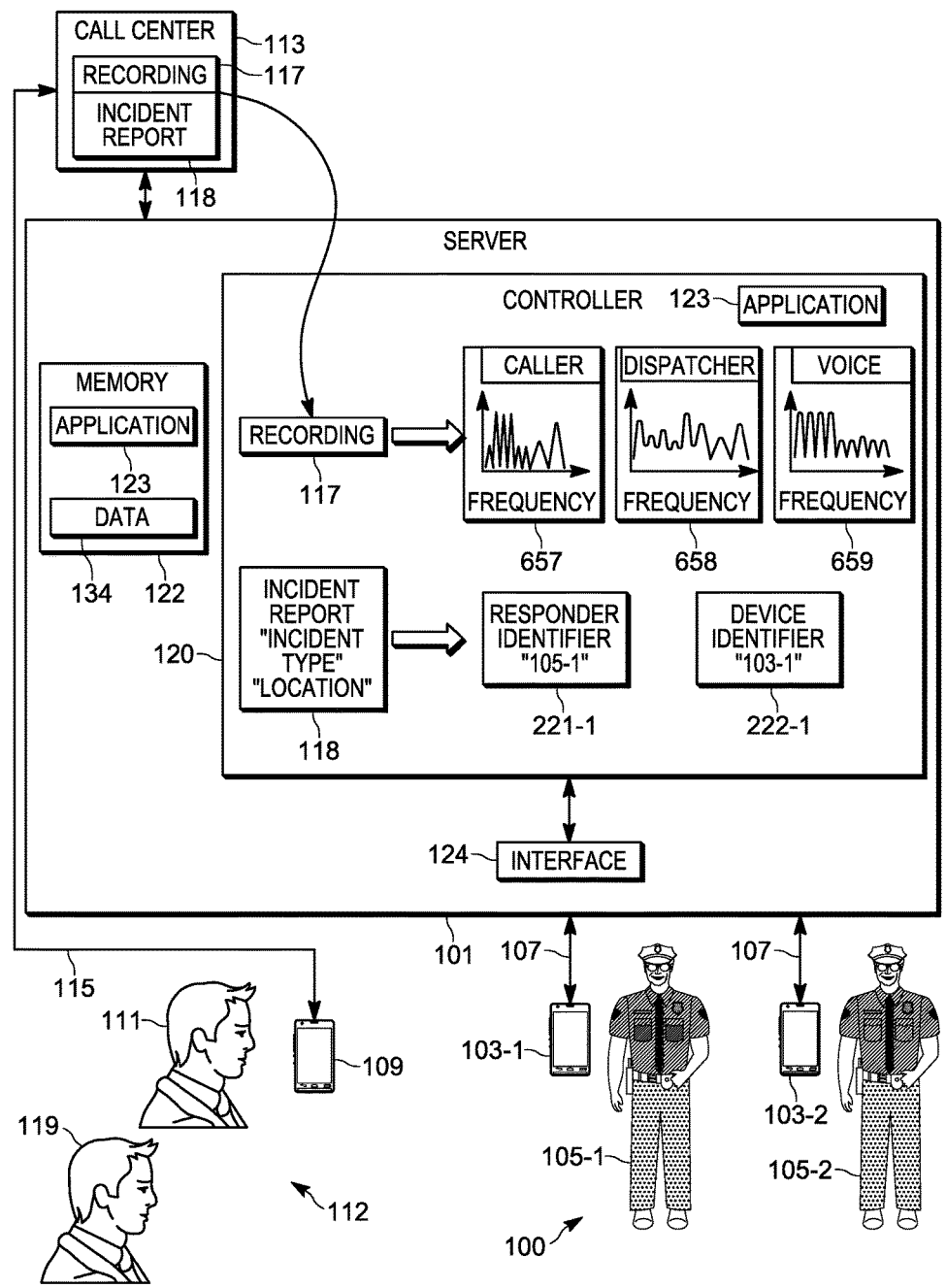
FIG. 6 depicts a server of the system of FIG. 1 generating a voiceprint of a caller associated with an incident from a recording of the caller, as well as other voices in the recording, in accordance with some embodiments.

Attention is next directed to FIG. 6 which depicts an example embodiment of the block 402 of the method 400, in which the server 101 receives the recording 117 from the call center 113, along with the incident report 118 (e.g. via a communication link therebetween). As depicted, the incident report 118 includes an incident type (e.g. as identified during the call to the call center 113, for example a "robbery", a "homicide", a "domestic dispute" etc.) and a location, for example an address of the location 112.

While present embodiments are described with respect to the server 101 and the call center 113 being separate, in some embodiments, the server 101 and the call center 113 are combined; in these embodiments, the recording 117 and the incident report 118 may be generated at the server 101 and stored in the memory 122, and the recording 117 may be received at the controller 120 from the memory 122 and/or a dispatcher terminal (not depicted).

Furthermore, while in present embodiments, the dispatcher voiceprint 257 is described as being stored at the memory 122 (e.g. in the data 134) in other embodiments the dispatcher voiceprint 257 may be received with the recording 117; in other words, the dispatcher voiceprint 257 may be stored at the call center 113 and transmitted to the server 101 with the recording 117.

Also depicted in FIG. 6 is an example embodiment of the block 404 of the method 400. For example, by the controller 120 executing the application 123, the controller 120 applies a spectrum analyzer algorithm, and the like, to generate voiceprints 657, 658, 659 of voices in the recording 117. For example, like the voiceprint 257, each of the voiceprints 657, 658, 659 comprise a respective frequency spectrum.

Each of the voiceprints 657, 658, 659 may be associated with the caller 111, a dispatcher on the call and one or more voices on the call that do not correspond to the caller 111 or the dispatcher. Such associations may occur by analyzing words spoken in the recording 117, and or a location of each voice in the recording 117. For example, the controller 120 may be configured to identify given words associated with callers in 911 calls, and the like and/or an initial voice in the recording 117, that is not a dispatcher's voice, may be the voice of the caller 111. Similarly, the dispatcher's voice may be identified using words and/or as a first voice in the call; alternatively, the voiceprints 657, 658, 659 may be compare with the dispatcher voiceprint 257 to filter out a voice of a dispatcher from the recording 117, the recording 117 generated via the dispatcher speaking with the caller 111 in the call.

The other voices on the call that don't meet criteria of either the caller 111 or the dispatcher on the call may be identified as further voices on the call.

Indeed, as depicted in FIG. 6, the controller 120 has identified: the voiceprint 657 as being a voiceprint of a voice of the caller 111; the voiceprint 658 as being a voiceprint of a voice of the dispatcher on the call (e.g. as the voiceprint 658 is similar to the voiceprint 257); and the voiceprint 659 as being a voiceprint of another voice on the call which does not belong to either of the caller 111 and the dispatcher on the call. For example, the voiceprint 659 may belong to voice of the person 119.

Alternatively, the blocks 402, 404 may be performed by the controller 330 of the device 103-1, presuming the device 103-1 is in communication with the call center 113 and has access to the data 134. For example, the recording 117 may be transmitted to the device 103-1 in a dispatch command.

Also depicted in FIG. 6 is an example embodiment of the block 406 of the method 400. For example, from the incident report 118, the controller 120 identifies a responder 105-1 to be dispatched to the location 112 to address the incident associated with the call. For example, the responder 105-1 may be automatically selected from the responders 105 based on their present location relative to the location 112 and/or selected via a dispatcher associated with the server 101, who may, or may not, be the same dispatcher who took the call from the caller 111. In any event, once the responder 105-1 (e.g. via the responder identifier 221-1) has been selected, the associated device 103—is identified (e.g. via the device identifier 222-1) using, for example, the records 220 stored at the memory 122.

When the method 400 is being implemented at the device 103-1, however, the block 406 may be optional. For example, the device 103-1 may already be dispatched to the location 112 to address the incident associated with the call.

Figure 7:
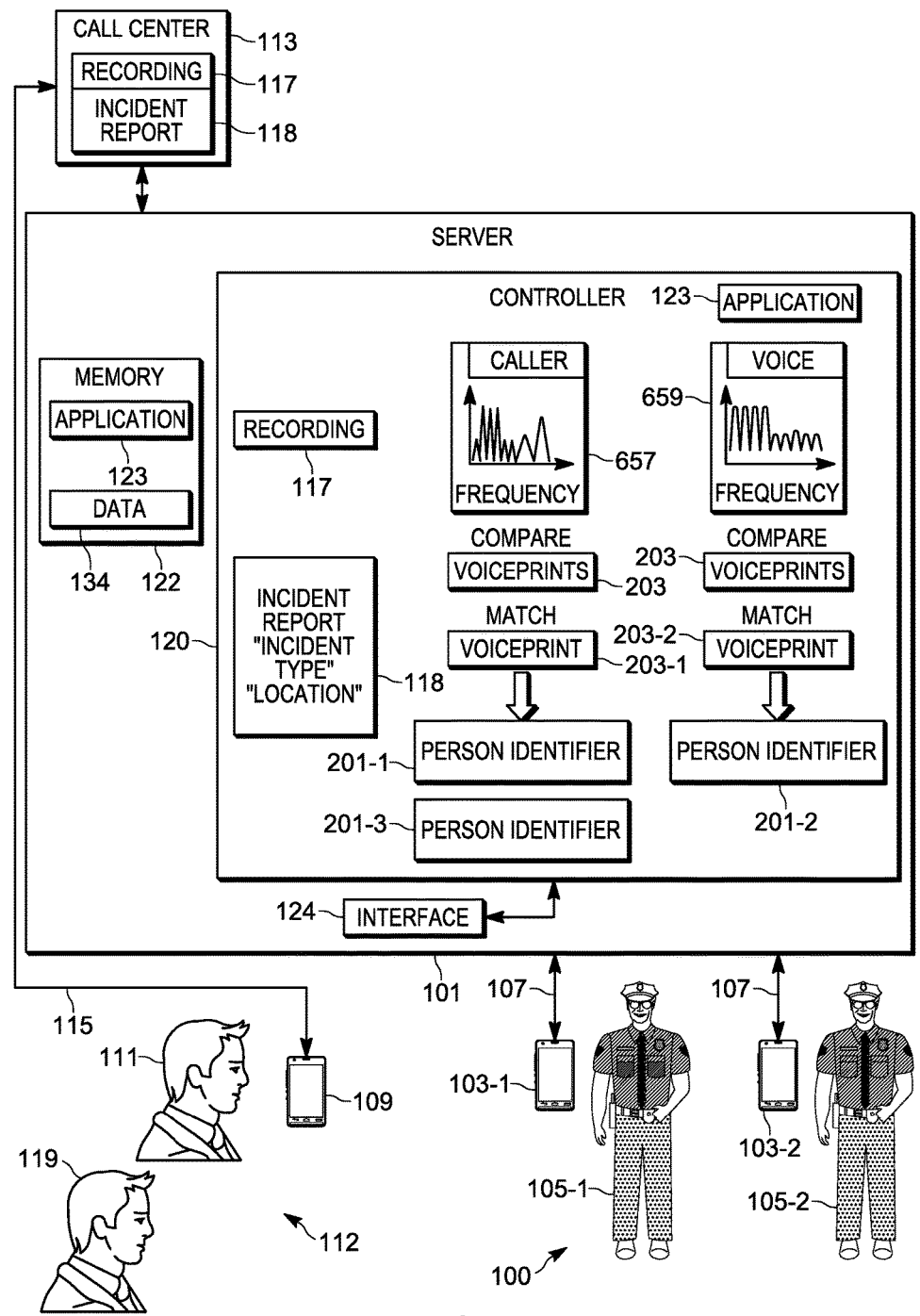
FIG. 7 depicts the server of the system of FIG. 1 comparing a voiceprint of the caller to voiceprints stored in a memory in accordance with some embodiments.

Attention is next directed to FIG. 7 which depicts an alternative embodiment in which the controller 120 is further configured to compare the voiceprint 657 of the caller 111 to the voiceprints 203 stored at the memory 122 to determine an identifier 201 of the caller 111. The voiceprints 203 correspond to one or more voiceprints of previous callers to the call center 113. Alternatively, such a comparison may occur at the device 103-1.

The controller 120 may compare the voiceprint 657 to the voice prints 203 that are stored as part of the records 220, to determine a match between the voiceprint 657 and a voiceprint 203. Presuming a match occurs, then the associated person identifier 201 is determined to be an identifier of the caller 111. For example, as depicted, the caller 111 has been identified using the person identifier 201-1 as a match has occurred between the voiceprint 657 and the voiceprint 203-1.

Similarly, the controller 120 may further compare the voiceprint 659 to the voiceprints 203 stored at the memory 122 to determine an identifier 201 of further speakers in the call. As depicted, the voiceprint 659 has been identified as being associated with the person identifier 201-2 as a match has occurred between the voiceprint 659 and the voiceprint 203-2.

Alternatively, the controller 120 may identify, from the memory 122 (e.g. from the data 134) one or more further voiceprints 203 of one or more persons associated with one or more of: the caller 111; the location 112 associated with the incident; and an incident type of the incident.

For example, the data 134 may be used to determine known associates of the caller 111; for example, when the caller 111 is identified by the person identifier 201-1, and a person having the person identifier 201-3 is a known associate, and/or a known criminal associate. Hence, the associated voiceprint 203-3 may be identified as being associated with the caller 111.

Similarly, the incident report 118 may indicate the location 112 of the caller 111, and the location 112 may be compared with the location identifiers 205 of the data 134 to identify persons associated with the location 112, and the associated voiceprints 203. Such an association may include the location 112 being the same as one or more of the locations identified by the location identifiers 205 and/or the one or more of the locations identified by the location identifiers 205 being within a given distance of the location 112.

Similarly, the incident report 118 may indicate an incident type of the incident associated with the call made by the caller 111, and the controller 120 may compare the incident type with the reports 207 to identify persons associated with the same and/or similar incident types.

The voiceprints 203, and/or indications thereof, of the one or more persons associated with one or more of, the caller 111, the location 112 associated with the incident, and an incident type of the incident may be transmitted to the device 103-1 of the responder 105-1 assigned to the incident.

For example, as depicted the person identifier 201-3 has been identified as being associated with the incident, the caller 111 and/or the location 112.

Furthermore, when reports 207 of the persons identified on the recording 117 indicate that they may be violent criminals, and the like, such information from the reports may also be transmitted to the device 103-1 of the responder 105-1 assigned to the incident.

Figure 8:
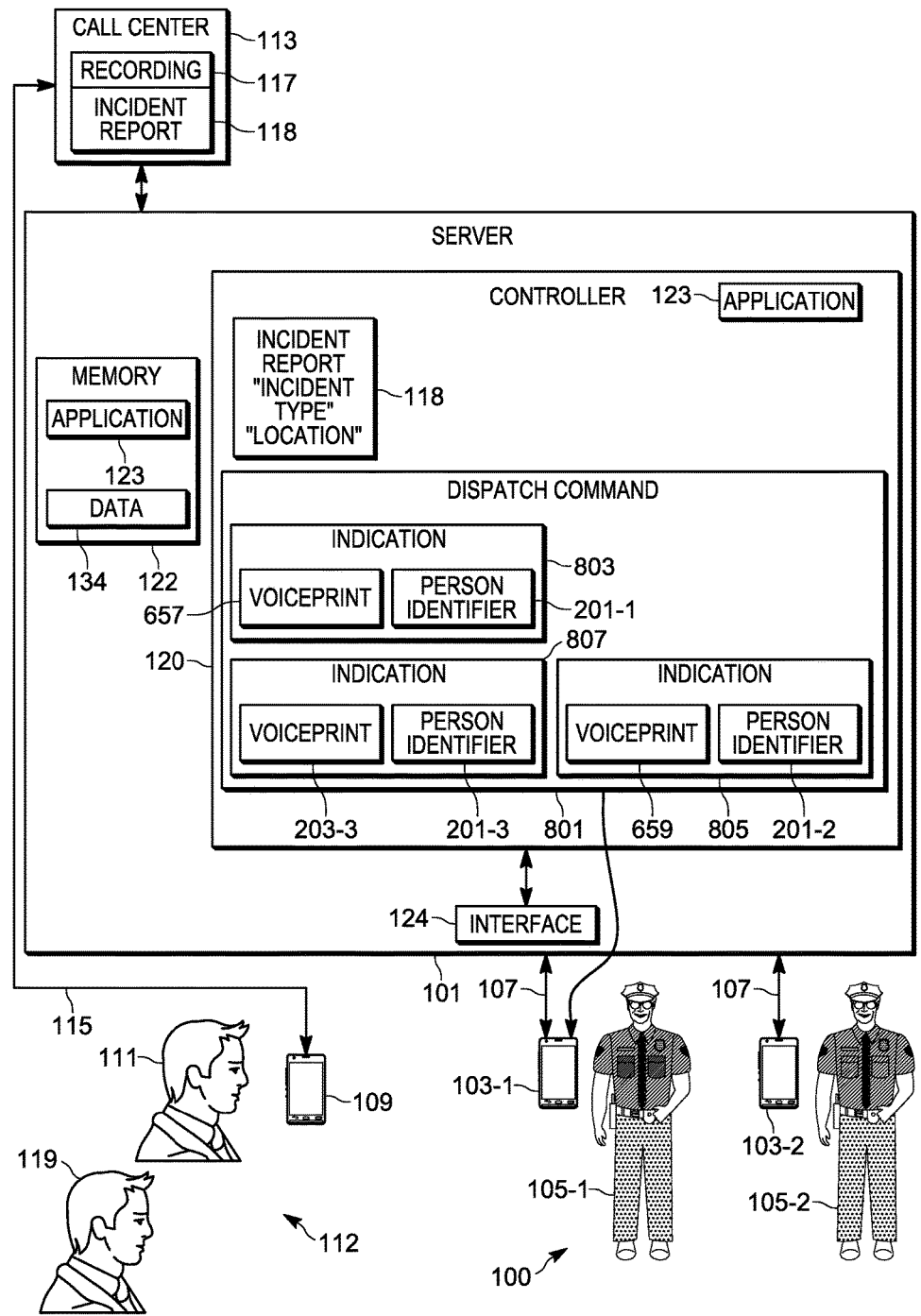
FIG. 8 depicts the server of the system of FIG. 1 transmitting an indication of voiceprint of the caller to a communication device of a responder dispatched to the incident in accordance with some embodiments.

Attention is next directed to FIG. 8 which depicts an example embodiment of the block 408 of the method 400 and example embodiment of the block 502 of the method 500. For example, the controller 120 generates a dispatch command 801 and transmits the dispatch command 801 to the device 103-1 of the responder 105-1 responding to the incident associated with the call, using the interface 124.

As depicted, the dispatch command 801 includes an indication 803 of the voiceprint 657 of the caller 111. Indeed, as depicted, the indication 803 of the voiceprint 657 of the caller 111 includes the voiceprint 657 such that a comparison of the voiceprint 657 with sound received at the microphone 332 of the device 103-1 may occur at the controller 320 of the device 103-1.

However, in other embodiments, the indication 803 of the voiceprint 657 of the caller 111 may not include the voiceprint 657; rather, in such embodiments, the indication 803 of the voiceprint 657 may include data indicative of the server 101 having generated the voiceprint 657, which is used to trigger and/or cause the device 103-1 to record the sound from the microphone 332 for transmission back to the server 101 for comparison.

In other words, the indication 803 causes a comparison of the voiceprint 657 of the caller 111 with sound received at the microphone 332 of the device 103-1, the comparison occurring at the device 103-1 and/or at the server 101. Indeed, even when the comparison occurs at the device 103-1, the comparison may be repeated at the server 101 for example to verify the comparison.

As depicted, the indication 803 further includes the person identifier 201-1 of the caller 111 as determined from the data 134.

As depicted, the dispatch command 801 further comprises an indication 805 of the voiceprint 659 (and specifically the indication 805 includes the voiceprint 659 in the depicted example) of the other speaker on the call, as well as the person identifier 201-2 thereof as determined from the data 134.

As depicted, the dispatch command 801 further comprises an indication 807 of the voiceprint 203-3 (and specifically the indication 807 includes the voiceprint 203-3 in the depicted example) of a person associated with the incident, as described above, as determined from the data 134.

However, in other embodiments, the dispatch command 801 may not include the indications 805, 807 and/or may include only one of the indications 805, 807. In other words, the indications 805, 807 are optional.

Furthermore, in other embodiments, the indication 803 (and optionally the indications 805, 807) may be transmitted to the device 103-1 without being incorporated into a dispatch command.

While not depicted, it is assumed that the dispatch command 801 may include an identifier of the location 112, for example as received in the incident report 118, and other information from the incident report, for example an incident type.

Put another way, in FIG. 7 and FIG. 8 the controller 320: identifies, from the memory 122, one or more further voiceprints 203 of one or more persons associated with one or more of: the caller 111; a location 112 associated with the incident; and an incident type of the incident; and transmits, using the communications interface 124, to the communication device 103-1, for each identified further voiceprint: the identified further voiceprint 203 and a respective identifier of an associated person 201.

When the method 400 is being implemented at the device 103-1, however, the block 408 may be optional. For example, the device 103-1 may already be dispatched to the location 112 to address the incident associated with the call.

Figure 9:
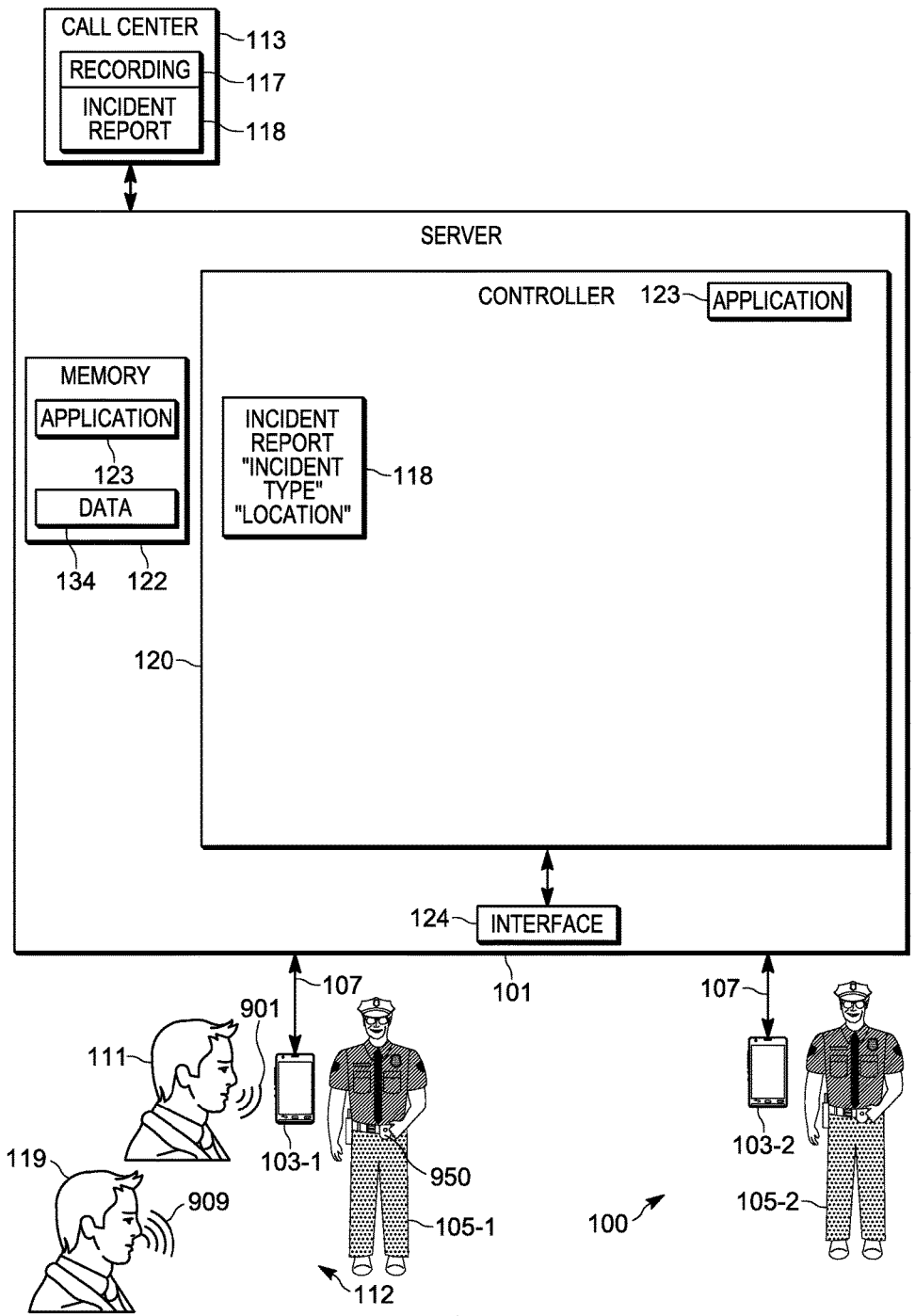
FIG. 9 depicts the communication device of the responder of the system of FIG. 1 receiving a voice of persons at the incident in accordance with some embodiments.

Attention is next directed to FIG. 9 which depicts an example embodiment of the block 504 of the method 500. As depicted, the responder 105-1 has responded to receiving the dispatch command by going to the location 112 to inquire about the call received at the call center 113, for example in response to receiving the dispatch command 801.

As depicted, the responder 105-1 is talking to the caller 111, and sound 901 from the caller 111 is being received at the microphone 332 of the device 103-1, the sound 901 comprising the voice of the caller 111. As depicted, the other person at the location 112 may also be speaking, and sound 909 from the person 119 is also being received at the microphone 332 of the device 103-1, the sound 909 comprising the voice of the person 119.

The device 103-1 may be configured to initiate receiving of the sound at the respective microphone 332 when one or more following conditions occur: when the communication device 103-1 is within a given distance from the location 112 of the incident (e.g. as determined from the location determining device 350 and the like); when the responder 105-1 is determined to be out of an associated vehicle (not depicted, but which may be used to travel to the location 112, and which may be determined from the location determining device 350 and the like); when the responder 105-1 is determined to be travelling below a threshold speed (e.g. the threshold speed indicative of the responder 105-1 walking and not running, as determined from the location determining device 350 and the like); when a voice of the responder 105-1 is detected (e.g. when the responder 105-1 initiates a conversation a person at the location 112, which may include keywords recognized by the controller 320); and when a holster detection sensor indicates that a weapon has not been drawn (e.g. the responder 105-1 may have a weapon in a holster 950 that includes a holster detection sensor in communication with the device 103-1 via the interface 324).

In general, initiation of the receiving of the sound at the respective microphone 332 may occur when the responder 105-1 is out of a vehicle, not running, not engaging a weapon and talking to a person at the location 112.

Various example embodiments of the block 506 of the method 500 will now be described.

Figure 10:
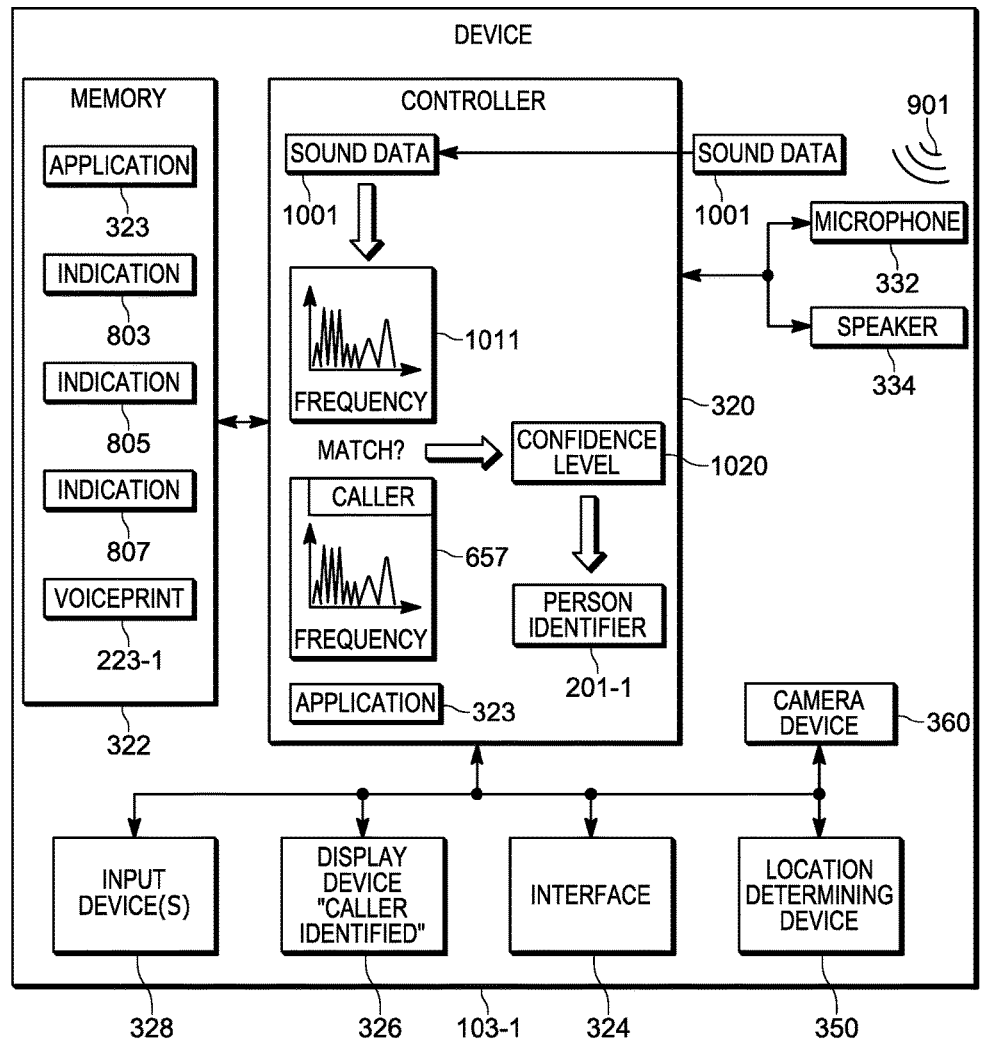
FIG. 10 depicts the server of the system of FIG. 1 comparing a voiceprint of a voice received at the communication device with the voiceprint of the caller in accordance with some embodiments.

Attention is next directed to FIG. 10 which depicts an example embodiment of the block 506 of the method 500 at the device 103-1, which is assumed to have the structure of the device 103 depicted in FIG. 3. It is further assumed in FIG. 10 that the memory 322 stores the indications 803, 805, 807 as described above, as well as the voiceprint 223-1 of the responder 105-1.

In particular, the device 103-1 is depicted as receiving the sound 901 at the microphone 332, the sound 901 being converted to sound data 1001 (such as a recording of the sound 901) by the microphone 332, the controller 320 and/or a combination thereof. While the microphone 332 may also receive the sound 909, it is assumed in this embodiment that the person 119 is initially silent when the responder 105-1 first speaks with the caller 111.

In the example embodiment, the controller 320 generates a voiceprint 1011 for each of the voices in the sound data 1001, but may filter out the voice of the responder 105-1 using the voiceprint 223-1.

As depicted, the controller 320 compares the voiceprint 657 of the caller 111 received in the indication 803, with the voiceprint 1011 to determine whether there is a match or not. Such a determination of match may be threshold based and may be implemented using any suitable algorithm for comparing voiceprints: when the comparison of the voiceprints 657, 1011 results in a match above a threshold value (e.g. a 50% match) the controller 320 may determine that a match occurred; and, when the comparison of the voiceprints 657, 1011 results in a match below the threshold value (e.g. a 50% match) the controller 320 may determine that a match has not occurred. The controller 320 may responsively initiate an action based on the whether a match occurred or did not occur.

Alternatively, as depicted, in the comparison, the controller 320 may determine a confidence level 1020 of a comparison between the voiceprint 657 and the voiceprint 1011 and responsively initiate an action based on the confidence level 1020.

For example, the confidence level 1020 may indicate whether the voiceprint 657 of the caller 111 and the voiceprint 1011 match by using a percentage scale: e.g. the voiceprint 657 of the caller 111 and the voiceprint 1011 may match by 10%, 20%, 30% . . . 80%, 90%, etc. In some embodiments, however, the confidence level 1020 may indicate either a match or no match. The action which is initiated may depend on the confidence level of the comparison, as described in further detail below.

It will be assumed, however, that the confidence level 1020 indicates a match between the voiceprint 657 of the caller 111 and the voiceprint 1011 and hence, the caller 111 has been identified by the controller 320 as being present at the location 112. In some embodiments, the display device 326 may be controlled to provide an indication of a successful match, as depicted the text "Caller Identified". In some embodiments, the person identifier 201-1 may also be provided at the display device 326 and/or may be provided to the responder 105-1 as an audio output via the speaker 334.

Figure 11:
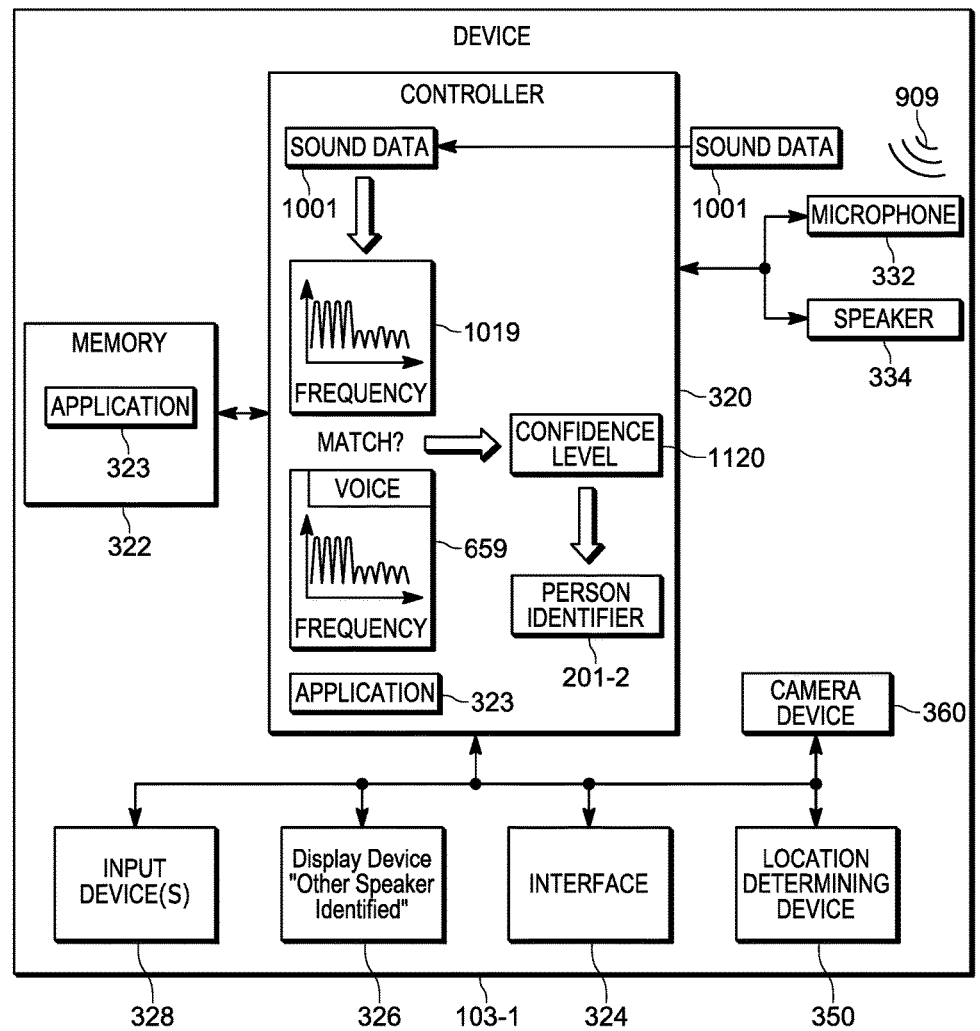
FIG. 11 depicts the server of the system of FIG. 1 comparing a voiceprint of another voice received at the communication device with a voiceprint of other voices in the recording in accordance with some embodiments.

Furthermore, assuming that the person 119 begins to speak and the sound 909 is received at the microphone 332 and converted to sound data 1001 (e.g. both the sound 901 and the sound 909 may be converted to the sound data 1001), as depicted in FIG. 11, the controller 320 may further determine a confidence level 1120 between the voiceprint 659 and the voiceprint 1019 that is extracted from the sound data 1001. It will be assumed, however, that the confidence level 1020 indicates that the voiceprint 1011 matches with the voiceprint 647 which corresponds to person identifier 201-2 of the person 119. In some embodiments, the display device 326 may be controlled to provide an indication of a successful match, as depicted the text "Other Speaker Identified". In some embodiments, the person identifier 201-2 associated with the matching voiceprint 647 may also be provided at the display device 326 and/or as an audio output at the speaker 334.

While not depicted, the controller 320 may further determine a confidence level of a comparison between the voiceprint 659 of the person 119 (received in the indication 805) and the voiceprint 1011 of the caller 111, however it is further assumed that such a match will indicate that no match has occurred between the voiceprint 659 of the person 119 and the voiceprint 1011.

While not depicted, the controller 320 may further determine a confidence level of a comparison between the voiceprint 203-3 of an associated person (received in the indication 807) and the voiceprint 1011, however it is further assumed that such a match will indicate that no match has occurred between the voiceprint 203-3 of the associated person and the voiceprint 1011.

Hence, in each of FIG. 10 and FIG. 11, speakers on the call associated with the incident at the location 112 are successfully identified by the device 103, and a confidence level of respective comparisons are determined.

Figure 12:
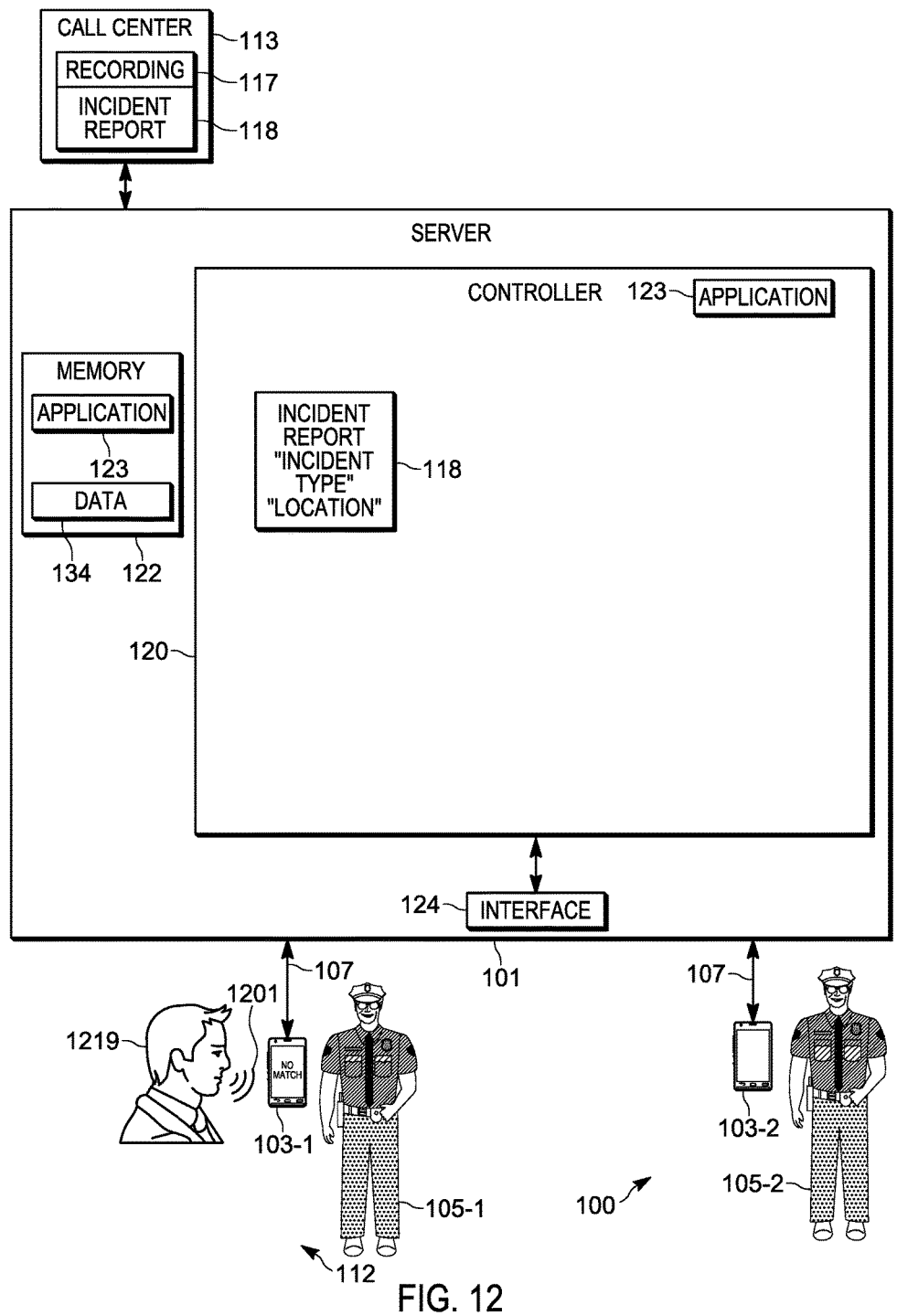
FIG. 12 depicts the communication device of the responder of the system of FIG. 1 providing an indication of no match between a voice of a person at the incident and a voice of a caller in the recording in accordance with some embodiments.

However, consider the situation in FIG. 12 in which the responder 105-1 has arrived at the location 112 and is speaking to a person 1219 who is not the caller 111. For example, the person 1219 may be the person 119 or another person whose voice was not on the call. In these embodiments, a confidence level of a comparison between the voiceprint 657 of the caller 111, and sound 1201 received at the microphone 332 from the person 1219, may indicate no match (as generally shown at the display device 326 of the device 103-1 in FIG. 12).

In some embodiments, actions initiated by a confidence level indicating a match, or not, between the voiceprint 657 of the caller 111 and the sound 901 received at the device 103-1 may be initiated at the device 103-1, for example when the device 103-1 determines the confidence level.

For example, such actions initiated by the device 103-1 when the confidence level 1020 indicates a match include, but are not limited to: providing a notification, at the communication device 103-1, of "not" the caller 111 (e.g. as in FIG. 10); notifying a computing device, such as the server 101, that the voiceprint 657 of the caller 111 was matched to the sound 901; storing an indication that the voiceprint 657 of the caller 111 was matched to the sound 901, for example in the memory 322; and triggering a recording of one or more of voice and video (e.g. using the camera device 360) for storage as evidentiary data.

For example, such actions initiated by the device 103-1 when the confidence level 1020 indicates the voiceprint 657 was not matched to the sound 901 include, but are not limited to: scanning for other voices in the sound received from the microphone 332 (e.g. for voices other than the caller 111 and/or the other person 119); providing a notification, at the communication device 103-1, of not finding the caller 111 (e.g. at the display device 326); and determining when the sound received at the microphone 332 contains one or more given keywords and responsively providing the notification, at the communication device 103, of not finding the caller. It is further assumed that neither is the voiceprint 657 matched to the sound 909.

For example, with regards to determining when the sound data 1001 contains one or more given keywords, the controller 320 may be further enabled to process the sound data 1001 to extract keywords that may include phrases such as "Yes, I called" and the like; such keywords indicate that a person (e.g. the person 1219) whose voice is captured in the sound data 1001 is telling the responder 105-1 that they are the caller, while the comparison of a voiceprint of the person with the voiceprint 657 of the caller 111 indicates that a match did not occur. In these embodiments, the controller 320 may control the display device 326 and/or another notification device at the device 103-1, to indicate that the person at the location 112 is lying.

Figure 13:
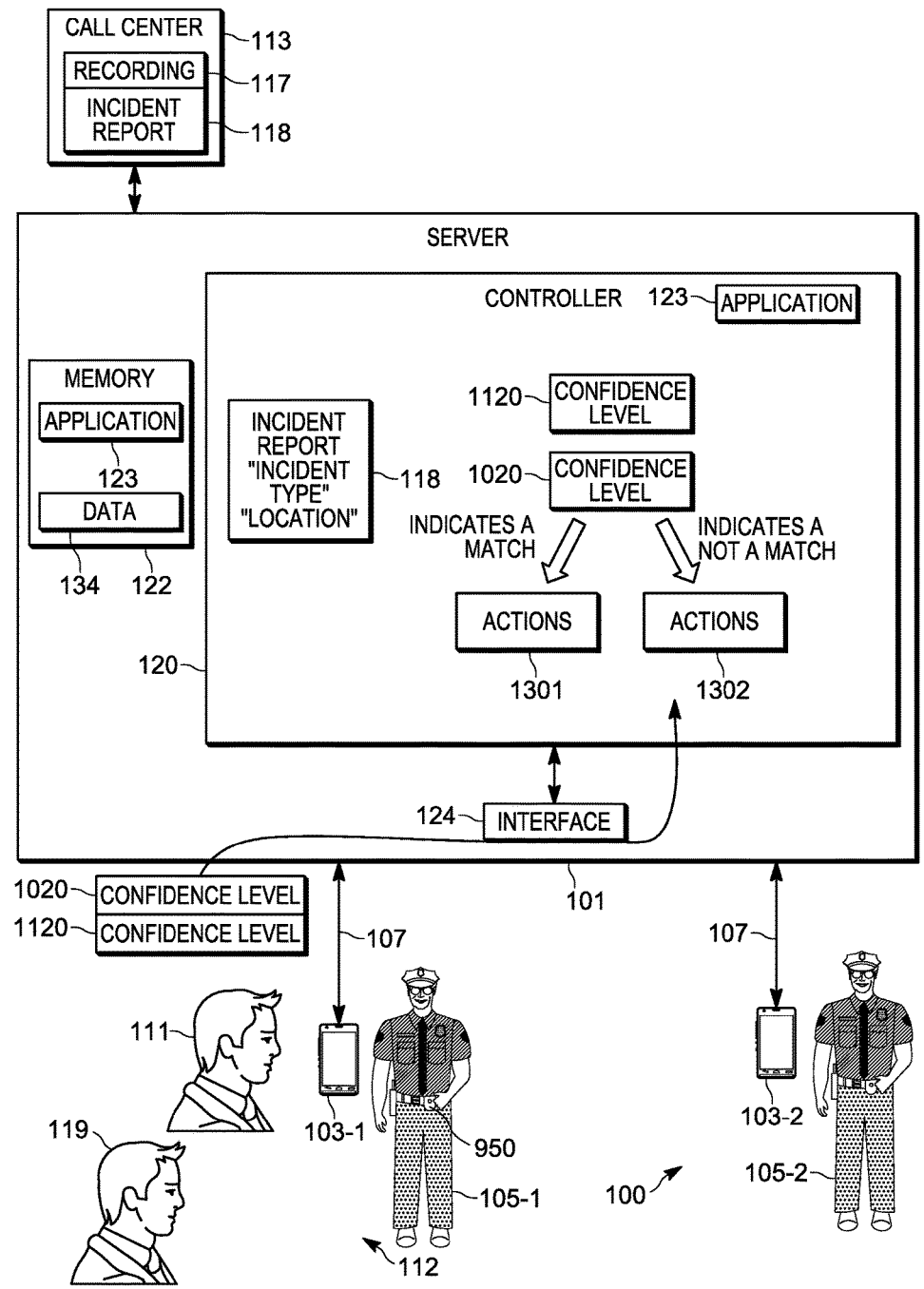
FIG. 13 depicts the communication device of the responder of the system of FIG. 1 providing confidence levels of matches between voices of persons at the incident and voices of in the recording in accordance with some embodiments.

In any event, with reference to FIG. 13, the device 103-1 transmits at least the confidence level 1020 back to the server 101 to cause the server 101 to initiate an action based on the confidence level 1020. As depicted, the device 103-1 further transmits the confidence level 1120 to the server 101.

In other words, in some embodiments, the controller 120 is further configured to: receive, using the communications interface 124, from the communication device 103-1: a confidence level of a comparison between the voiceprint of the caller in the recording and the sound received at the communication device; and initiate the action based on the confidence level of the comparison.

In other embodiments, the device 103-1 transmits other determined confidence levels of comparisons between other voiceprints received at the device 103-1 and sound received at the microphone 332, such as the confidence level 1120.

While present embodiments are described with respect to a comparison between the sound received at the device 103-1 and a voiceprint 657 of the caller 111 (as well as a comparison with other voiceprints) occurring at the device 103-1, in other embodiments, the comparison may occur at the server 101. For example, the device 103-1 may transmit the sound data 1001 to the server 101 such that the server 101 may perform the comparison depicted in FIG. 10 and FIG. 11, as well as a comparison with voiceprints 203 stored in the data 134. Indeed, in such embodiments, the indication 803 does not include the voiceprint 657 of the caller 111, but merely triggers the device 103-1 to transmit the sound data 1001, when acquired. Furthermore, in these embodiments, the server 101 may generate the confidence levels 1020, 1120, and initiate an action, as described in more detail below; in other words, in these embodiments, the block 408 of the method 400 includes the controller 120: receiving the sound received at the microphone 332 from the device 103-1 (e.g. as the sound data 1001); comparing the sound to the voiceprint of the caller 111 to determine a confidence level of the comparison; and initiate an action based on the confidence level. However, the comparison and the initiation of the action may alternatively occur at the device 103-1 at which the sound was received at the microphone 332.

In any event, in FIG. 13, the server 101 has received (and/or generated) the confidence level 1020 and the controller 120 initiates an action based on a comparison between the voiceprint 657 of the caller and the sound 901 received at the communication device 103-1.

Furthermore, in some embodiments, the controller 120 initiates an action based on the comparison and the incident type received in the incident report 118.

In any event, in FIG. 13, the controller 120 may initiate one or more of a first set of actions 1301 when the confidence level 1020 indicates the voiceprint 657 was matched to the sound 901, and the controller 120 may initiate one or more of a second set of actions 1302 when the confidence level 1020 indicates the voiceprint 657 was not matched to the sound 901.

Furthermore, the action initiated may further depend on the incident type, as received in the incident report 118, the confidence level 1120, any associated records 200, and the like.

The first set of actions 1301 (e.g. that may occur when a confidence level indicates a match) may include, but are not limited to: storing an indication that the voiceprint 657 was matched to the sound (e.g. such an indication could be stored in the incident report 118 to indicate that the caller 111 was identified); annotating the indication that the voiceprint 657 was matched to the sound with one or more of an identifier of the incident (e.g. the incident report 118) and a location 112 of the incident; triggering movement of a responder vehicle (e.g. of the responder 103-2) from a covert location to a not covert location; notifying a team of responders (e.g. including the responder 103-2) that are within a geofence assigned to incident of successfully finding the caller 111, by transmitting an indication of successfully finding the caller 111 to communication devices (e.g. including the device 103-2) associated with the team of responders; and triggering a recording (e.g. at the device 103-1) of one or more of voice and video for storage as evidentiary data. Furthermore, the first set of actions 1301 may include disbanding the geofence, and/or generating a new geofence.

Indeed, when the confidence level 1120 indicates a match with a person having a criminal record and/or a violent criminal record, an indication may be transmitted to the device 103-1 to warn the responder 105-1.

The second set of actions 1302 (e.g. that may occur when a confidence level indicates a match did not occur) may include, but are not limited to: storing an indication that the voiceprint 657 was not matched to the sound (e.g. such an indication could be stored in the incident report 118 to indicate that the caller 111 was not identified); annotating the indication that the voiceprint 657 was not matched to the sound with one or more of an identifier of the incident (e.g. the incident report 118) and a location 112 of the incident; triggering movement of a responder vehicle (e.g. of the responder 103-2) to remain at a covert location; and notifying a team of responders (e.g. including the responder 103-2), that are one or more of within a geofence or assigned to the incident, of successfully finding the caller 111, by transmitting an indication of unsuccessfully finding the caller 111 to communication devices (e.g. including the device 103-2) associated with the team of responders. Furthermore, the first set of actions 1301 may include disbanding the geofence, and/or generating a new geofence.

Figure 14:
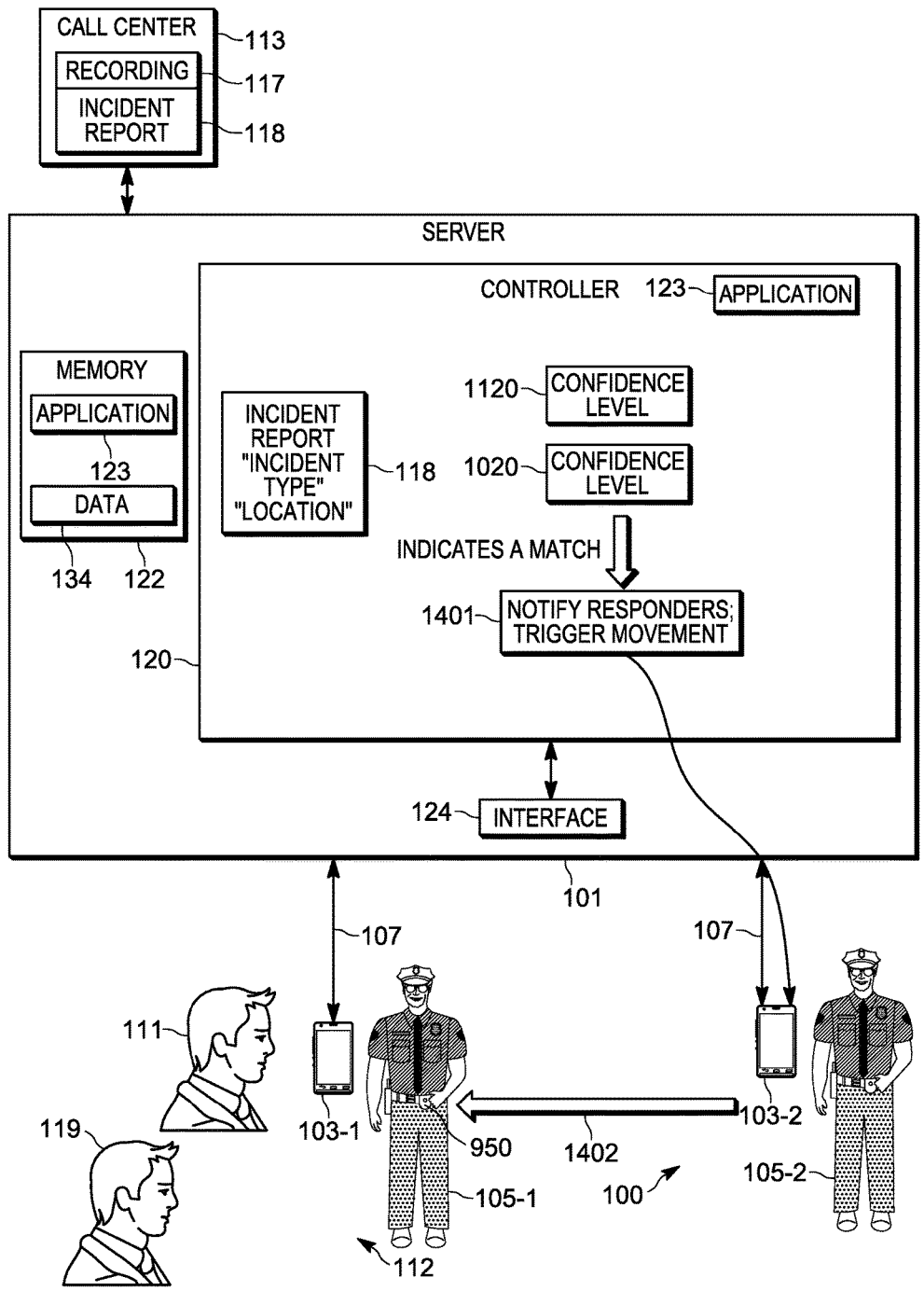
FIG. 14 depicts the server of the system of FIG. 1 dispatching other responders to the incident in accordance with some embodiments.

For example, with reference to FIG. 14, assuming that the confidence level 1020 indicates the voiceprint 657 was matched to the sound 901, the controller 320 may notify the responder 105-2 of the match, by transmitting an indication thereof to the device 103-2, for example in a dispatch command 1401, which also dispatches the responder 105-2 to the location 112 (e.g. "trigger movement"). In response, the responder 105-2, who may be in a vehicle in a covert location, drives and/or moves to the location 112, as indicated by arrow 1402.

However, the actions 1301, 1302 which are initiated may depend on the incident type. For example, for lower priority incident types, for example incident types that that are either not classified as major crimes and/or do not involve imminent bodily injury to either responders or civilians, such as a report of a minor break-in at the location 112, the actions 1301, 1302 may include only storing whether the caller 111 was reached or not, and/or annotation thereof.

However, for higher priority incident types, for example incident types that that are either classified as major crimes and/or involve imminent bodily injury to either responders or civilians, such as a report of a person with a weapon, the actions 1301, 1302 may include deploying (or not) further responders from a covert location to the location 112.

Furthermore, the actions 1301, 1302 which are initiated may depend on the confidence level 1120 and/or reports 207 associated with the caller 111 and/or the identified person 119. For example, in some embodiments, the confidence levels 1020, 1120 may indicate that the caller 111 and/or the person 119 is at the location 112. Furthermore, the caller 111 and/or the person 119 may have further been identified from the data 134. When their associated reports 207 indicate that one or more of the caller 111 and the person 119 is a wanted criminal and/or has a history of violence, possessing illegal weapons, and the like, a team of responders 105 may be deployed to the location 112, but may be instructed to remain at a covert location.

Similarly, when the caller 111 is not identified at the location 112, a team of responders may be deployed to the location 112, when the incident is a high priority incident.

However, deployment of further responders to the location 112 may depend on a dispatcher and/or the responder 105-1 confirming a need for such deployment (e.g. by interaction with, respectively, a dispatcher terminal or the device 103-1).

Similarly, a recording of the voice of the person 1219 (e.g. not the caller 111) may be transmitted to the server 101 by the device 103-1, and identified from the records 200. When an associated report 207 indicates that the person 1219 is a wanted criminal and/or has a history of violence, possessing illegal weapons, and the like, a team of responders 105 may be deployed to the location 112.

Similarly, sound from the person 1219 indicates that the person 1219 is the person identified by the person identifier 201-1 (e.g. a known associate of the caller 111), an appropriate action may be initiated based on whether or not the known associate is pretending to be the caller 111, not pretending to be the caller 111 (as determined using keywords, and the like), whether the known associate has a criminal record and/or the incident type.

In any event, provided herein is a device, system and method for validating a 911 caller. From a recording of a 911 call reporting an incident, a voiceprint of the caller is generated. A device of a responder responding to the 911 call receives sound from a person who may say they are the caller. A voiceprint of such a person is generated and compared to the voiceprint of the caller, either at the device of the responder, and/or at a server. An action is initiated based on whether a match occurs. The action may depend on the incident type and/or whether other voices received at the device of the responder match voiceprints of known criminals, and the like.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of at least two items X, Y, and Z (e.g., XYZ, XY, YZ, XZ, and the like). Similar logic may be applied for at least two items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A computing device for determining a match between an emergency caller and a user voice detected after arrival at an incident, the computing device comprising:
   a controller and a communications interface, the controller configured to:
     receive a recording including a voice sample of a caller, the recording associated with an incident;
     generate, from the voice sample, a voiceprint for the caller;
     identify a communication device of a responder responding to the incident at a location associated with the incident; and
     transmit, using the communications interface, an indication of the voiceprint for the caller to the communication device, to cause: a comparison of the voiceprint with sound received at the communication device, the sound received at the communication device at the location associated with the incident; and, in response to the comparison, an initiation of an action.

2. The computing device of claim 1, wherein the indication of the voiceprint comprises the voiceprint, and the controller is further configured to:
   receive, using the communications interface, from the communication device: a confidence level of a comparison between the voiceprint of the caller in the recording and the sound received at the communication device; and
   initiate the action based on the confidence level of the comparison.

3. The computing device of claim 1, wherein the controller is further configured to: based on the comparison between the voiceprint and the sound received at the communication device, initiate the action.

4. The computing device of claim 3, wherein the controller is further configured to:
   receive an incident type of the incident; and
   initiate the action based on the comparison and the incident type.

5. The computing device of claim 1, wherein the controller is further configured to:
   compare the voiceprint of the caller to voiceprints stored at a memory to determine an identifier of the caller; and
   transmit, using the communications interface, to the communication device, the identifier of the caller.

6. The computing device of claim 1, wherein the recording includes further voice samples of further speakers different from the caller, and the controller is further configured to:
   generate, from the further voice samples, a respective voiceprint for each of the further speakers; and
   transmit, using the communications interface, to the communication device, the respective voiceprint for each of the further speakers with the voiceprint for the caller.

7. The computing device of claim 1, wherein the controller is further configured to:
   identify, from a memory, one or more further voiceprints of one or more persons associated with one or more of: the caller; the location associated with the incident; and an incident type of the incident; and
   transmit, using the communications interface, to the communication device, for each identified further voiceprint: the identified further voiceprint and a respective identifier of an associated person.

8. The computing device of claim 1, wherein the controller is further configured to filter out a voice of a dispatcher from the recording, the recording generated via the dispatcher speaking with the caller in a call.

9. A method for determining a match between an emergency caller and a user voice detected after arrival at an incident, the method comprising:
   receiving, at a controller of a computing device, via a communication interface of the computing device, a recording including a voice sample of a caller, the recording associated with an incident;
   generating, at the controller, from the voice sample, a voiceprint for the caller;
   identifying, at the controller, a communication device of a responder responding to the incident at a location associated with the incident; and
   transmitting, using the communications interface, an indication of the voiceprint for the caller to the communication device, to cause: a comparison of the voiceprint with sound received at the communication device, the sound received at the communication device at the location associated with the incident; and, in response to the comparison, an initiation of an action.

10. The method of claim 9, wherein the indication of the voiceprint comprises the voiceprint, and the method further comprises:
    receiving, using the communications interface, from the communication device: a confidence level of a comparison between the voiceprint of the caller in the recording and the sound received at the communication device; and
    initiating, at the controller, the action based on the confidence level of the comparison.

11. The method of claim 9, further comprising: based on the comparison between the voiceprint and the sound received at the communication device, initiating, at the controller, the action.

12. The method of claim 11, further comprising:
receiving, at the controller, an incident type of the incident; and
initiating, at the controller, the action based on the comparison and the incident type.

13. The method of claim 9, further comprising:
comparing, at the controller, the voiceprint of the caller to voiceprints stored at a memory to determine an identifier of the caller; and
transmitting, using the communications interface, to the communication device, the identifier of the caller.

14. The method of claim 9, wherein the recording includes further voice samples of further speakers different from the caller, and the method further comprises:
generating, from the further voice samples, a respective voiceprint for each of the further speakers; and
transmitting, using the communications interface, to the communication device, the respective voiceprint for each of the further speakers with the voiceprint for the caller.

15. The method of claim 9, further comprising:
identifying, at the controller, from a memory, one or more further voiceprints of one or more persons associated with one or more of: the caller; the location associated with the incident; and an incident type of the incident; and
transmitting, using the communications interface, to the communication device, for each identified further voiceprint: the identified further voiceprint and a respective identifier of an associated person.

16. A system for determining a match between an emergency caller and a user voice detected after arrival at an incident, the system comprising:
a computing device; and a communication device associated with a responder responding to an incident,
the computing device configured to:
receive a recording including a voice sample of a caller, the recording associated with the incident;
generate, from the voice sample, a voiceprint for the caller;
identify a communication device of a responder responding to the incident at a location associated with the incident; and
transmit an indication of the voiceprint for the caller to the communication device, to cause: a comparison of the voiceprint with sound received at the communication device, the sound received at the communication device at the location associated with the incident, and, in response to the comparison, an initiation of an action,
the communication device configured to:
receive the indication of the voiceprint;
receive the sound at the location associated with the incident, using a microphone at the communication device; and
cause the voiceprint to be compared to the sound to determine a confidence level of a comparison between the voiceprint and the sound, such that the action is initiated based on the confidence level of the comparison.

17. The system of claim 16, wherein the communication device is further configured to initiate receiving of the sound at the microphone when one or more following conditions occur:
when the communication device is within a given distance from the location associated with the incident;
when the responder is determined to be out of an associated vehicle;
when the responder is determined to be travelling below a threshold speed;
when a voice of the responder is detected; and
when a holster detection sensor indicates that a weapon has not been drawn.

18. The system of claim 16, wherein the communication device is further configured to cause the action to be initiated based on the confidence level of the comparison by: determining the confidence level of the comparison; and transmitting the confidence level of the comparison to the computing device.

19. The system of claim 16, wherein the action includes one or more of, when the confidence level indicates the voiceprint was matched to the sound:
notifying the computing device that the voiceprint was matched to the sound;
storing an indication that the voiceprint was matched to the sound;
annotating the indication that the voiceprint was matched to the sound with one or more of an identifier of the incident and a location associated with the incident;
triggering movement of a responder vehicle from a covert location to a not covert location;
notifying a team of responders, that are one or more of within a geofence or assigned to the incident, of successfully finding the caller, by transmitting an indication of successfully finding the caller to communication devices associated with the team of responders; and
triggering a recording of one or more of voice and video for storage as evidentiary data.

20. The system of claim 16, wherein the action includes one or more of, when the confidence level indicates the voiceprint was not matched to the sound:
scanning for other voices in the sound from the microphone;
providing a notification, at the communication device, of not finding the caller; and
determining when the sound contains one or more given keywords and responsively providing the notification, at the communication device, of not finding the caller.

* * * * *